(12) United States Patent
Hedin

(10) Patent No.: US 9,772,219 B2
(45) Date of Patent: Sep. 26, 2017

(54) APPARATUS FOR MONITORING THE CONDITION OF A MACHINE

(71) Applicant: S.P.M. INSTRUMENT AB, Strangnas (SE)

(72) Inventor: Lars-Olov Elis Hedin, Hallstahammar (SE)

(73) Assignee: S.P.M. INSTRUMENT AB, Strangnas (SE)

( * ) Notice: Subject to any disclaimer, the term of this patent is extended or adjusted under 35 U.S.C. 154(b) by 355 days.

(21) Appl. No.: 14/425,472

(22) PCT Filed: Sep. 11, 2013

(86) PCT No.: PCT/SE2013/051062
§ 371 (c)(1),
(2) Date: Mar. 3, 2015

(87) PCT Pub. No.: WO2014/042582
PCT Pub. Date: Mar. 20, 2014

(65) Prior Publication Data
US 2015/0226603 A1    Aug. 13, 2015

Related U.S. Application Data

(60) Provisional application No. 61/732,483, filed on Dec. 3, 2012.

(30) Foreign Application Priority Data

Sep. 11, 2012   (SE) ...................................... 1200552

(51) Int. Cl.
*G01B 5/28* (2006.01)
*G01B 5/30* (2006.01)
(Continued)

(52) U.S. Cl.
CPC .......... *G01H 1/003* (2013.01); *G01M 13/028* (2013.01); *G01M 13/045* (2013.01); *G05B 19/4069* (2013.01); *G05B 19/416* (2013.01)

(58) Field of Classification Search
CPC .. G01H 1/003; G01M 13/045; G01M 13/028; G01M 99/005; G01M 99/008; G05B 19/4069; G05B 19/416; G05B 2219/37228
USPC ............................... 702/33, 35, 39, 182, 183
See application file for complete search history.

(56) References Cited

U.S. PATENT DOCUMENTS 4,302,813 A * 11/1981 Kurihara ................. F01D 19/00
                                                        702/56
5,109,700 A    5/1992 Hicho
(Continued)

FOREIGN PATENT DOCUMENTS

EP    1226414    7/2002
WO    0131309    5/2001
(Continued)

OTHER PUBLICATIONS

Supplemental Partial European Search Report for corresponding EP 13837138, mailed May 4, 2016.
(Continued)

*Primary Examiner* — An Do
(74) *Attorney, Agent, or Firm* — Young & Thompson

(57) ABSTRACT

A method for analyzing the condition of a machine, and an apparatus for analyzing the condition of a machine are described.

17 Claims, 10 Drawing Sheets

(51) Int. Cl.
  *G06F 11/30* (2006.01)
  *G21C 17/00* (2006.01)
  *G01H 1/00* (2006.01)
  *G01M 13/04* (2006.01)
  *G01M 13/02* (2006.01)
  *G05B 19/4069* (2006.01)
  *G05B 19/416* (2006.01)

(56) References Cited

U.S. PATENT DOCUMENTS

| | | | |
|---|---|---|---|
| 5,895,857 A | | 4/1999 | Robinson et al. |
| 8,810,396 B2 * | | 8/2014 | Hedin .................... G01H 1/003 340/540 |
| 8,812,265 B2 * | | 8/2014 | Hedin .................... G01H 1/003 702/183 |
| 2003/0137648 A1 | | 7/2003 | Van Voorhis et al. |
| 2008/0033695 A1 | | 2/2008 | Sahara et al. |

FOREIGN PATENT DOCUMENTS

| WO | 03/062766 A1 | 7/2003 |
|---|---|---|
| WO | 2010074646 A1 | 7/2010 |
| WO | 2011087440 A1 | 7/2011 |

OTHER PUBLICATIONS

International Search Report, dated Feb. 21, 2014, from corresponding PCT application.

* cited by examiner

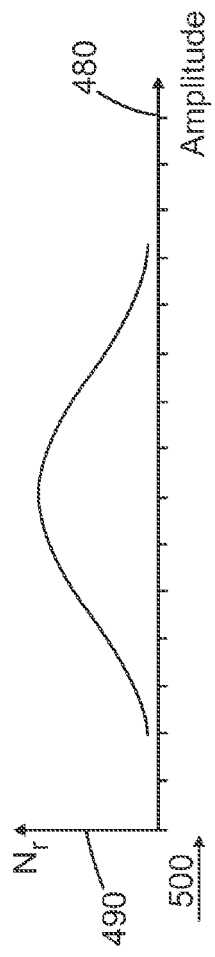

APPARATUS FOR MONITORING THE CONDITION OF A MACHINE

CROSS-REFERENCE TO RELATED APPLICATIONS

The present application claims priority to Application No. 1200552-6, filed in the Kingdom of Sweden on Sep. 11, 2012, which is expressly incorporated herein in its entirety by reference thereto.

The present application claims the benefit of U.S. Provisional Patent Application No. 61/732,483, filed on Dec. 3, 2012, which is expressly incorporated herein in its entirety by reference thereto.

FIELD OF THE INVENTION

The present invention relates to a method for analysing the condition of a machine, and to an apparatus for analysing the condition of a machine. The invention also relates to a system including such an apparatus and to a method of operating such an apparatus. The invention also relates to a computer program for causing a computer to perform an analysis function.

DESCRIPTION OF RELATED ART

Machines with moving parts are subject to wear with the passage of time, which often causes the condition of the machine to deteriorate. Examples of such machines with movable parts are motors, pumps, generators, compressors, lathes and CNC-machines. The movable parts may comprise a shaft and bearings.

In order to prevent machine failure, such machines should be subject to maintenance, depending on the condition of the machine. Therefore the operating condition of such a machine is preferably evaluated from time to time. The operating condition can be determined by measuring vibrations emanating from a bearing or by measuring temperature on the casing of the machine, which temperatures are dependent on the operating condition of the bearing. Such condition checks of machines with rotating or other moving parts are of great significance for safety and also for the length of the life of such machines. It is known to manually perform such measurements on machines. This ordinarily is done by an operator with the help of a measuring instrument performing measurements at measuring points on one or several machines.

A number of commercial instruments are available, which rely on the fact that defects in rolling-element bearings generate short pulses, usually called shock pulses. A shock pulse measuring apparatus may generate information indicative of the condition of a bearing or a machine.

WO 03062766 discloses a machine having a measuring point and a shaft with a certain shaft diameter, wherein the shaft can rotate when the machine is in use. WO 03062766 also discloses an apparatus for analysing the condition of a machine having a rotating shaft. The disclosed apparatus has a sensor for producing a measured value indicating vibration at a measuring point. The apparatus disclosed in WO 03062766 has a data processor and a memory. The memory may store program code which, when run on the data processor, will cause the analysis apparatus to perform a Machine Condition Monitoring function. Such a Machine Condition Monitoring function may include shock pulse measuring.

SUMMARY

An aspect of the invention relates to the problem of providing an improved method and an improved apparatus for analysis of the condition of a machine having a rotating part.

This problem is addressed by an apparatus for analysing the condition of a machine as described below. Various embodiments are disclosed below: An embodiment 1 comprises an apparatus for analysing the condition of a machine having a part (7,8) rotatable with a speed of rotation ($f_{ROT}$), comprising:

a transducer (10) for generating an analogue measurement signal (SEA) in response to machine vibration so that said analogue measurement signal (SEA) includes a vibration signal signature (SD) having
  a vibration frequency ($f_{SEA}$) which is lower than an upper frequency limit value ($f_{SEAmax}$) and
  at least one vibration signal repetition frequency ($f_D$) and
  a vibration signal amplitude;

an A/D converter (40, 44) adapted to generate a digital measurement signal ($S_{MD}$, $S_R$) having a sequence of sample values ($S_{MD}$, $S_R$) dependent on the analogue measurement signal ($S_{EA}$), said digital measurement signal ($S_{MD}$, $S_R$) having a first sample rate ($f_S$);

a digital peak value detector (310) adapted to generate output peak values ($A_{PO}$) dependent on said sequence of sample values ($S_{MD}$, $S_R$);

a peak value discriminator (870) being adapted to sort said output peak values ($A_{PO}$) into corresponding amplitude ranges during a measuring session;

a measuring session controller (904) adapted to control a duration ($T_{Meas}$) of said measuring session;

a condition value generator (1030) adapted to generate a first condition value ($LR_D$) in response to said sorted output peak values ($A_{PO}$) and said duration ($T_{Meas}$) so that
  said first condition value ($LR_D$) is indicative of a first amplitude value ($A_{LRD}$) having a first predetermined occurrence rate ($f_{C1}$), and so that
  said first condition value ($LR_D$) is based on a selected first temporal portion of the digital measurement signal ($S_{MD}$, $S_R$); the apparatus further comprising a decimator (1010) adapted to generate a decimated digital signal ($S_{RED}$; $S_{RED1}$; $S_{RED2}$) in dependence of said digital measurement signal ($S_{MD}$, $S_R$) so that the decimated digital signal ($S_{RED}$; $S_{RED1}$; $S_{RED2}$) has a reduced sampling frequency ($f_{SR1}$; $f_{SR1}$); and a Fourier Transformer (1020) adapted to generate a transformed signal ($S_{FT}$) in dependence of a selected second temporal portion of said decimated digital signal ($S_{RED}$; $S_{RED1}$; $S_{RED2}$) so that said transformed signal (SFT) is indicative of said vibration signal repetition frequency ($f_D$); said apparatus being arranged to coordinate the generation of said transformed signal (SFT) with the generation of the first condition value ($LR_D$) so that the selected second temporal portion of said decimated digital signal ($S_{RED}$; $S_{RED1}$; $S_{RED2}$) is based substantially on said selected first temporal portion of the digital measurement signal ($S_{MD}$), and so that said selected first temporal portion of the digital measurement signal ($S_{MD}$) is generated during the duration ($T_{Meas}$) of said measuring session.

This solution advantageously enables the delivery of
a first condition value ($LR_D$) which is indicative of the first amplitude value ($A_{LRD}$) of peak values ($A_{PO}$) having a first predetermined occurrence rate ($f_{C1}$) and of
a transformed signal (SFT) which is indicative of said vibration signal repetition frequency ($f_D$) while ensuring that the first condition value ($LR_D$) and the transformed signal (SFT) are consistent with each other, since both of them are based on the same or substantially the same temporal portion of the digital measurement signal ($S_{MD}$).

Hence, the first condition value ($LR_D$) and the transformed signal (SFT) are based on concurrent measurement data, or substantially the same measurement data, and as such the first condition value ($LR_D$) and the transformed signal (SFT) may complement each other by providing mutually different perspectives on the same event, i.e. the condition of the monitored rotatable machine part (7,8) during the measuring session, based on data collected during the whole duration ($T_{Meas}$) of the measuring session. According to a preferred embodiment said first sample rate ($f_S$) is at least twice said upper frequency limit value ($f_{SEAmax}$). According to a most preferred embodiment the duration ($T_{Meas}$) of said measuring session is a variably settable duration ($T_{Meas}$).

Embodiment 2: The apparatus according to claim 1, wherein
the condition value generator (1030) is adapted to generate a second condition value ($HR_{LUB}$) in response to said sorted output peak values ($A_{PO}$) and said duration ($T_{Meas}$) so that
said second condition value ($HR_{LUB}$) is indicative of a second amplitude value ($A_{HRLUB}$) having a second predetermined occurrence rate ($f_{C2}$), and so that
said second condition value ($HR_{LUB}$) is based on said selected first temporal portion of the digital measurement signal ($S_{MD}$, $S_R$).

According to an embodiment, the first condition value ($LR_D$) is indicative of the amplitude ($A_{LRD}$) of peak values ($A_{PO}$) having a first predetermined occurrence rate $f_{C1}$ of e.g. $f_{C1}$=40 pulses per second, and the second condition value ($HR_{LUB}$) is indicative of a second amplitude value ($A_{HRLUB}$) having a second predetermined occurrence rate $f_{C2}$ of e.g. $f_{C2}$=1000 pulses per second.

Measurement experience indicates that, during operation of a specific undamaged rotational part, such as a roller bearing, the amplitude levels of the first condition value ($LR_D$) and the second condition value ($HR_{LUB}$) vary with the amount of lubrication in between the rolling elements and the raceway, whereas a relation between first condition value ($LR_D$) and the second condition value ($HR_{LUB}$) remains substantially constant. However, when a surface damage occurs in the rotational part, e.g. in the raceway, measurement experience indicate that the amplitude values of the first condition value ($LR_D$) as well the second condition value ($HR_{LUB}$) increase significantly, and there is also a distinguishable change in the relation between first condition value ($LR_D$) and the second condition value ($HR_{LUB}$). More particularly, although both of the condition values ($LR_D$ and $HR_{LUB}$) increase in response to a surface damage, the amplitude of first condition value ($LR_D$) increases distinctly more than the amplitude of the second condition value ($HR_{LUB}$).

Accordingly, the combination of the values of the first condition value ($LR_D$) and the second condition value ($HR_{LUB}$) may be interpreted to indicate not only a lubrication condition of the rotational part, but it is also indicative of the mechanical condition of the surfaces of the rotational part.

Advantageously, this solution enables the delivery of a transformed signal (SFT) which is indicative of said vibration signal repetition frequency ($f_D$) while ensuring that the first condition value ($LR_D$), the second condition value ($HR_{LUB}$) and the transformed signal (SFT) are consistent with each other, since all these data are based on the same or substantially the same temporal portion of the digital measurement signal ($S_{MD}$). The first and the second condition values ($LR_D$, $HR_{LUB}$) are consistent with the transformed signal (SFT) in that they provide mutually different aspects of the condition of the monitored rotational part. So, for example, when damage occurs in the raceway of a monitored bearing, the first and the second condition values ($LR_D$, $HR_{LUB}$) will increase, as described above, thus indicating the presence of a surface damage. When the first and the second condition values ($LR_D$, $HR_{LUB}$) increase to such an extent as to indicate the presence of an incipient damage to the monitored rotational part, experience has shown that the transformed signal will provide information about what type of damage there is.

Hence, the first and the second condition values ($LR_D$, $HR_{LUB}$) as well as the transformed signal (SFT) are based on concurrent measurement data, or substantially the same measurement data, and as such the first and the second condition values ($LR_D$, $HR_{LUB}$) and the transformed signal (SFT) complement each other by providing mutually different perspectives on the same event, i.e. the condition of the monitored rotatable machine part (7,8) during the measuring session, based on data collected during the whole duration of the measuring session.

Since the transformed signal (SFT) is indicative of the vibration signal repetition frequency ($f_D$), it may be possible to establish e.g. whether the incipient damage is located on the inner ring of the monitored bearing or on the outer ring of the monitored bearing.

Embodiment 3: The apparatus according to embodiment 1 or 2, further comprising
an analyser (290) having
a first analyzer input 1050 for receiving said first condition value ($LR_D$);
a second analyzer input 1060 for receiving said second condition value ($HR_{LUB}$); wherein
the analyzer is adapted to generate a status signal indicative of whether the condition of the machine is normal or abnormal in dependence on said first condition value ($LR_D$) and said second condition value ($HR_{LUB}$).

The fact that the apparatus may generate the first condition value ($LR_D$) and the second condition value ($HR_{LUB}$) on the basis of measurement data ($S_{MD}$, $S_R$) collected during the uninterrupted time period of the variably settable duration ($T_{Meas}$) of said measuring session advantageously increases the reliability of the first condition value ($LR_D$) and the second condition value ($HR_{LUB}$) in the sense of truly reflecting the condition of the monitored part. When, for example, the monitored rotatable part is a bearing in a crane which sometimes carries a heavy load, and which sometimes runs substantially unloaded, the bearing will sometimes be subjected to a large force due to the carrying of the heavy load. In such a case it is desirable that the measurement data collected, i.e. the selected first temporal portion of the digital measurement signal ($S_{MD}$, $S_R$), includes the time period when the bearing is subjected to a large force. The variably settable duration ($T_{Meas}$) of the measurement session advantageously enables an operator of the apparatus to set the duration ($T_{Meas}$) so as to include the loaded time period in the measurement session.

Embodiment 4: The apparatus according to embodiment 3, further comprising
- an apparatus input for receiving a signal indicative of a detected speed of rotation ($f_{ROT}$) associated with said rotatable part (7,8);
- a third analyzer input 1070 for receiving said signal indicative of a detected speed of rotation ($f_{ROT}$);
- a fourth analyzer input 1080 for receiving a bearing frequency factor value (OR, IR, FTF, BS); and
- a fifth analyzer input 1090 for receiving said transformed signal ($S_{FT}$, $f_D$); wherein
- the analyzer is adapted to generate a status signal indicative of the nature of, and/or cause for, an abnormal machine condition in dependence of said speed of rotation signal ($f_{ROT}$), said bearing frequency factor value (OR, IR, FTF, BS) and said transformed signal ($S_{FT}$, $f_D$).

Embodiment 5: The apparatus according to embodiment 3, further comprising
- an apparatus input for receiving a signal indicative of a detected speed of rotation ($f_{ROT}$) associated with said rotatable part (7,8);
- a third analyzer 1070 input for receiving said signal indicative of a detected speed of rotation ($f_{ROT}$);
- a fourth analyzer input 1080 for receiving a bearing frequency factor value (OR, IR, FTF, BS); and
- a fifth analyzer input 1090 for receiving said transformed signal ($S_{FT}$, $f_D$); wherein
- the analyzer is adapted to generate a status signal indicative of a probable location of an incipient damage in dependence of
- said speed of rotation signal ($f_{ROT}$),
- said bearing frequency factor value (OR, IR, FTF, BS) and
- said transformed signal ($S_{FT}$, $f_D$).

Embodiment 6: The apparatus according to embodiment 3, further comprising
- an apparatus input 1040 for receiving a signal indicative of a detected speed of rotation ($f_{ROT}$) associated with said rotatable part (7,8);
- a third analyzer input 1070 for receiving said signal indicative of a detected speed of rotation ($f_{ROT}$);
- a fourth analyzer input 1080 for receiving a bearing frequency factor value (OR, IR, FTF, BS); and
- a fifth analyzer input 1090 for receiving said transformed signal ($S_{FT}$, $f_D$); wherein
- the analyzer is adapted to extract said at least one vibration signal repetition frequency ($f_D$) from said transformed signal ($S_{FT}$, $f_D$); and
- the analyzer is adapted to generate a frequency factor estimate ($F_{fEST}$) in dependence on said at least one vibration signal repetition frequency ($f_D$) and said detected speed of rotation ($f_{ROT}$); and
- the analyzer is adapted to compare the generated frequency factor estimate ($F_{fEST}$) with a stored plurality of frequency factors ($F_{fstore1}$, $F_{fstore2}$, $F_{fstore3}$, ... $F_{fstoren}$); and wherein
- the analyzer is adapted to generate a status signal indicative of a probable location of an incipient damage in dependence of said frequency factor comparison.

This solution may advantageously provide an explicit indication to the effect that a detected damage is located e.g. on the outer ring of a monitored bearing assembly, when the generated frequency factor estimate ($F_{fEST}$) has a value that substantially corresponds to a stored value of an Outer Ring frequency factor value.

Embodiment 7: The apparatus according to any of embodiments 1 to 6, further comprising:
- an associator (1035, 290) adapted to associate
- said first condition value ($LR_D$) with
- said transformed signal (SFT).

Embodiment 8: The apparatus according to any of embodiments 1 to 6, further comprising:
- a digital rectifier (270 adapted to perform a rectification so as to generate a rectified digital signal (SR) dependent on said digital measurement signal ($S_{MD}$); and wherein
- the digital peak value detector (310) is adapted to generate the output peak values (APO) dependent on said rectified digital signal (SMD, SR); and
- said decimator (1010) is adapted to perform said decimation on the rectified digital signal (SR) so as to achieve said decimated digital signal (SRED; SRED1; SRED2) having a reduced sampling frequency (fSR; fSR1). p Embodiment 9: The apparatus according to embodiment 8, wherein:
- the digital rectifier (270) is adapted to perform a full-wave rectification so as to generate a rectified digital signal (SR) dependent on said digital measurement signal ($S_{MD}$) including absolute values of said sequence of sample values ($S_{MD}$, $S_R$).

Embodiment 10: An apparatus for analysing the condition of a machine having a part (7) rotatable with a speed of rotation ($f_{ROT}$), comprising
- an input (42) for receiving an analogue measurement signal ($S_{EA}$) indicative of a vibration signal signature ($S_D$) having a vibration frequency ($f_{SEA}$) and at least one repetition frequency ($f_D$);
- an A/D converter (40, 44) adapted to generate a digital measurement signal ($S_{MD}$) having a sequence of sample values dependent on the analogue measurement signal, said digital measurement signal ($S_{MD}$) having a first sample rate (fS), wherein said vibration frequency (fSEA) is assumed to be lower than half of the first sample rate (fS);
- a digital rectifier (270) adapted to perform a rectification so as to generate a rectified digital signal (SR) dependent on said digital measurement signal ($S_{MD}$);
- a digital peak value detector (310) adapted to deliver output peak values (APO) on a peak value detector output (315) dependent on said rectified digital signal ($S_R$);
- a peak value discriminator (870) being adapted to sort said output peak values ($A_{PO}$) into corresponding amplitude ranges during a measuring session;
- a measuring session controller (904) adapted to control a duration ($T_{Meas}$) of said measuring session;
- a condition value generator adapted to generate a first condition value ($LR_D$) in response to said sorted output peak values ($A_{PO}$) and said duration ($T_{Meas}$) so that said first condition value ($LR_D$) is based on a selected first temporal portion of the digital measurement signal ($S_{MD}$); the apparatus further comprising
- a decimator (1010) for performing a decimation of the rectified digital signal ($S_R$) so as to achieve a decimated digital signal ($S_{RED}$; $S_{RED1}$; $S_{RED2}$) having a reduced sampling frequency ($f_{SR}$; $f_{SR1}$); and
- a Fourier Transformer (1020) adapted to generate a transformed signal (SFT) in dependence on a selected second temporal portion of said decimated digital signal ($S_{RED}$; $S_{RED1}$; $S_{RED2}$); said apparatus being arranged to coordinate the generation of said transformed signal (SFT) with the generation of the first condition value ($LR_D$) so that the selected second temporal portion of said decimated digital signal ($S_{RED}$; $S_{RED1}$; $S_{RED2}$) is based substantially on said selected first temporal portion of the digital measurement signal ($S_{MD}$).

Problem: Correct detection of peak values in an analogue measurement signal ($S_{EA}$) having transient vibration signal signatures ($S_D$) having a vibration frequency ($f_{SEA}$) and at least one repetition frequency ($f_D$) require a high sample rate in order to actually sample the analogue signal at a moment of peak value. This problem is addressed by the following embodiment:

Embodiment 11: An apparatus for analysing the condition of a machine having a part (7) rotatable with a speed of rotation ($f_{ROT}$), comprising an input (42) for receiving an analogue measurement signal ($S_{EA}$) indicative of a vibration signal signature ($S_D$) having a vibration frequency ($f_{SEA}$) and at least one repetition frequency ($f_D$);

an A/D converter (40, 44) adapted to generate a digital measurement signal ($S_{MD}$) dependent on the analogue measurement signal, said digital measurement signal ($S_{MD}$) having a first sample rate ($f_S$), the first sample rate being at least twice (k) said vibration frequency ($f_{SEA}$);

a digital rectifier (270) adapted to perform full-wave rectification so as to generate a rectified digital signal ($S_R$) dependent on said digital measurement signal ($S_{MD}$);

a smoothing stage (TOP-3) adapted to generate a smoothened digital signal ($S_{Smooth}$) dependent on said rectified digital signal ($S_R$); said smoothing stage (TOP-3) being adapted to adjust an output sample amplitude value ($S_{SOUT\_i}$) upwards in dependence on the amplitude of the corresponding input sample amplitude value ($S_{SIN\_i}$) and in dependence on the amplitude of temporally adjacent input sample amplitude values ($S_{SIN\_i-1}$, $S_{SIN\_i+1}$);

an asymmetric digital filter for generating an asymmetrically low pass filtered signal ($S_{ASYM}$) in response to the smoothed digital signal ($S_{Smooth}$); the asymmetric digital filter being adapted to generate the asymmetrically filtered signal ($S_{ASYM}$) so that in response to a detected positive time derivative of the smoothed digital signal a first settable filter value (k) is set to a first value (KRise); and in response to a detected negative time derivative of the smoothed digital signal said first settable filter value (k) is set to a second value (kFall);

a peak value detector (330) adapted to deliver output peak values ($A_{PO}$) on a peak value detector output (333) in response to said detected peak values ($A_P$); and wherein said peak value detector is adapted to limit the delivery frequency of said output peak values ($A_P$, $A_{PO}$) such that said output peak values ($A_P$, $A_{PO}$) are delivered at a maximum delivery frequency of $f_{dP}$, wherein $$f_{dP}=f_s/e$$

where $f_S$ is said first sample rate, and
e is an a number higher than two.

Advantageously, the smoothing stage will eliminate "dents" in the rectified signal, and it will do so by always adjusting the amplitude upwards. Thus, whereas the rectified signal may include a sampled value having significantly lower amplitude that its neighbour samples, the signal from the smoothing stage will always be smooth. Whereas such a smoothing effect may also be achieved by means of a median-value-filter, the median-filter would also reduce the top amplitude value of the output signal in relation to the top value of the rectified input signal. Hence, whereas a median-filter would make the signal more smooth, the smoothing stage as defined above will not only make the signal more smooth, but it will also maintain the amplitude values of the highest detected amplitudes in the rectified signal.

Embodiment 12: The apparatus according to embodiment 11, wherein the smoothing stage includes a first peak sample selector (TOP-3) adapted to analyze v consecutive received sample values, and to identify the highest amplitude of these v consecutive received sample values, and to deliver v consecutive output sample values with at least one of the v consecutive output sample values having an adjusted amplitude value, said adjustment being an amplitude increase, wherein, v is an integer having a value of about fs/$f_{SEA}$.

Embodiment 13: The apparatus according to embodiment 11, wherein the smoothing stage includes a first peak sample selector which is adapted to receive a plurality of temporally consecutive sample values; and identify the amplitude of a selected sample value from among said received plurality of consecutive sample values; and analyze the amplitude of the selected sample value, the amplitude of the sample immediately preceding the selected sample value and the amplitude of the sample succeeding the selected sample value; and deliver an output sample value in response to said selected sample value so that said output sample value has an amplitude corresponding to the highest amplitude detected in said analysis.

Embodiment 14: The apparatus according to embodiment 11, wherein:

the asymmetric digital filter is adapted to generate the asymmetrically filtered signal ($S_{ASYM}$) so that in response to a detected positive time derivative of the smoothed digital signal ($S_{Smooth}$) the asymmetrically filtered signal ($S_{ASYM}$) will have a positive time derivative substantially equal to that of the smoothed digital signal ($S_{Smooth}$); and in response to a detected negative time derivative of the smoothed digital signal ($S_{Smooth}$) the asymmetrically filtered signal ($S_{ASYM}$) will have a comparatively slow response.

Embodiment 15: The apparatus according to any of embodiments 11-14, further comprising a decimator, a fourier transformer and a measuring session controller as defined in embodiment 1.

Embodiment 16: The apparatus according to embodiment 15, wherein said apparatus is arranged to coordinate the generation of said transformed signal (SFT) with the generation of the first condition value ($LR_D$) so that the selected second temporal portion of said decimated digital signal ($S_{RED}$; $S_{RED1}$; $S_{RED2}$) is based substantially on said selected first temporal portion of the digital measurement signal ($S_{MD}$), and so that said selected first temporal portion of the digital measurement signal ($S_{MD}$) is generated during the variably settable duration ($T_{Meas}$) of said measuring session.

BRIEF DESCRIPTION OF THE DRAWINGS

For simple understanding of the present invention, it will be described by means of examples and with reference to the accompanying drawings, of which:

FIG. 9 is a schematic illustration of plural memory positions arranged as a table.

FIG. 10 illustrates a histogram having plural amplitude bins.

FIG. 11 is an illustration of a cumulative histogram table corresponding to the histogram table of FIG. 9.

DETAILED DESCRIPTION OF EMBODIMENTS

Figure 1:
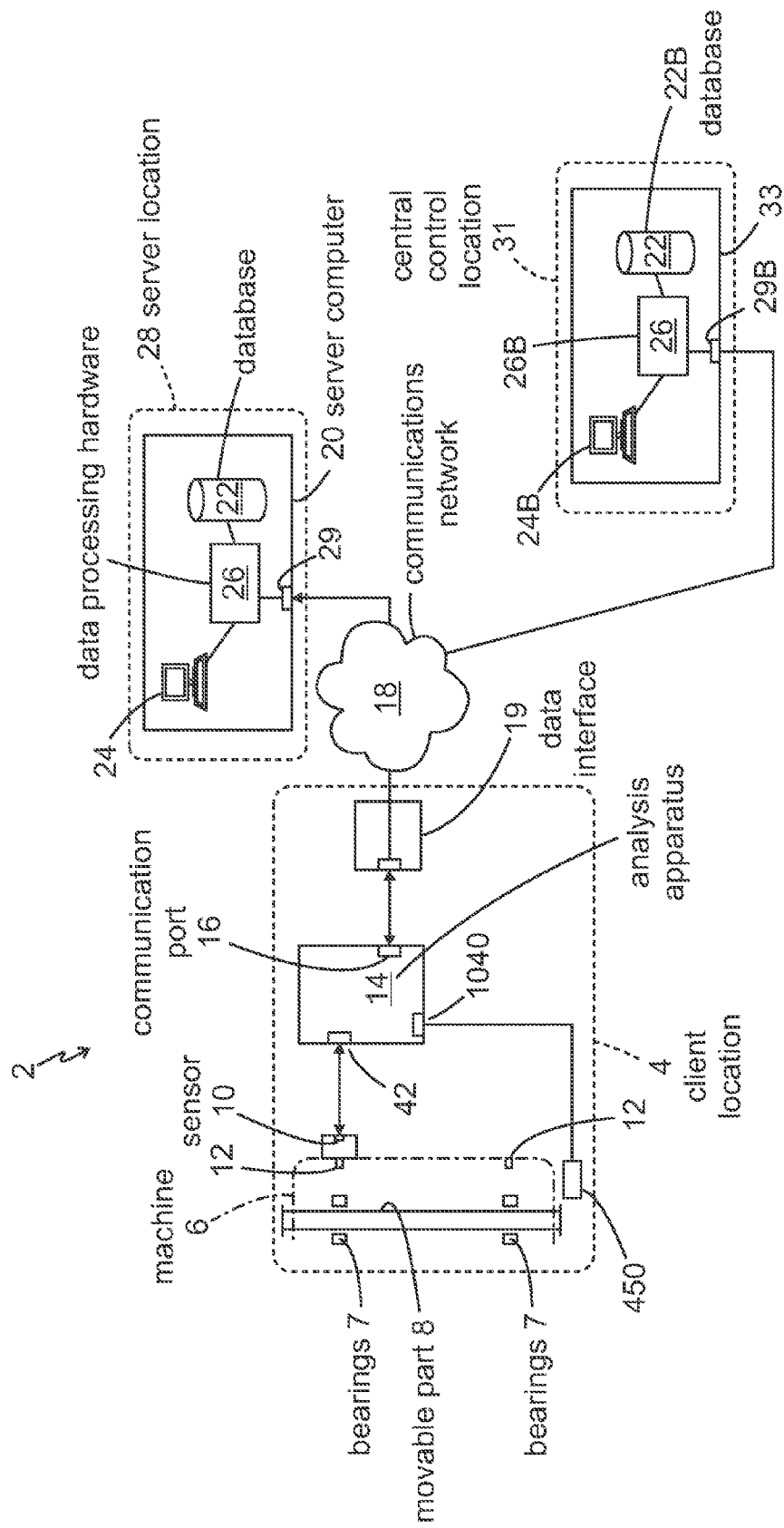
FIG. 1 shows a schematic block diagram of an embodiment of a condition analyzing system 2 according to an embodiment of the invention including an analysis apparatus.

In the following description similar features in different embodiments may be indicated by the same reference numerals.

FIG. 1 shows a schematic block diagram of an embodiment of a condition analyzing system 2 according to an embodiment of the invention. Reference numeral 4 relates to a client location with a machine 6 having a movable part 8. The movable part may comprise bearings 7 and a shaft 8 which, when the machine is in operation, rotates. The operating condition of the shaft 8 or of a bearing 7 can be determined in response to vibrations emanating from the shaft and/or bearing when the shaft rotates. The client location 4, which may also be referred to as client part or user part, may for example be the premises of a wind farm, i.e. a group of wind turbines at a location, or the premises of a paper mill plant, or some other manufacturing plant having machines with movable parts.

An embodiment of the condition analyzing system 2 is operative when a sensor 10 is attached on or at a measuring point 12 on the body of the machine 6. Although FIG. 1 only illustrates two measuring points 12, it to be understood that a location 4 may comprise any number of measuring points 12. The condition analysis system 2 shown in FIG. 1, comprises an analysis apparatus 14 for analysing the condition of a machine on the basis of measurement values delivered by the sensor 10.

The analysis apparatus 14 has a communication port 16 for bi-directional data exchange. The communication port 16 is connectable to a communications network 18, e.g. via a data interface 19. The communications network 18 may be the world wide internet, also known as the Internet. The communications network 18 may also comprise a public switched telephone network.

A server computer 20 is connected to the communications network 18. The server 20 may comprise a database 22, user input/output interfaces 24 and data processing hardware 26, and a communications port 29. The server computer 20 is located on a location 28, which is geographically separate from the client location 4. The server location 28 may be in a first city, such as the Swedish capital Stockholm, and the client location may be in another city, such as Stuttgart, Germany or Detroit in Michigan, USA. Alternatively, the server location 28 may be in a first part of a town and the client location may be in another part of the same town. The server location 28 may also be referred to as supplier part 28, or supplier part location 28.

According to an embodiment of the invention a central control location 31 comprises a control computer 33 having data processing hardware and software for surveying a plurality of machines at the client location 4. The machines 6 may be wind turbines or gear boxes used in wind turbines. Alternatively the machines may include machinery in e.g. a paper mill.

The control computer 33 may comprise a database 22B, user input/output interfaces 24B and data processing hardware 26B, and a communications port 29B. The central control location 31 may be separated from the client location 4 by a geographic distance. By means of communications port 29B the control computer 33 can be coupled to communicate with analysis apparatus 14 via port 16. The analysis apparatus 14 may deliver measurement data being partly processed so as to allow further signal processing and/or analysis to be performed at the central location 31 by control computer 33.

A supplier company occupies the supplier part location 28. The supplier company may sell and deliver analysis apparatuses 14 and/or software for use in an analysis apparatus 14. The supplier company may also sell and deliver analysis software for use in the control computer at the central control location 31. Such analysis software 94,105 is discussed in connection with FIG. 4 below. Such analysis software 94,105 may be delivered by transmission over said communications network 18.

According to one embodiment of the system 2 the apparatus 14 is a portable apparatus which may be connected to the communications network 18 from time to time.

According to another embodiment of the system 2 the apparatus 14 is connected to the communications network 18 substantially continuously. Hence, the apparatus 14 according to this embodiment may substantially always be "on line" available for communication with the supplier computer 20 and/or with the control computer 33 at control location 31.

Figure 2A:
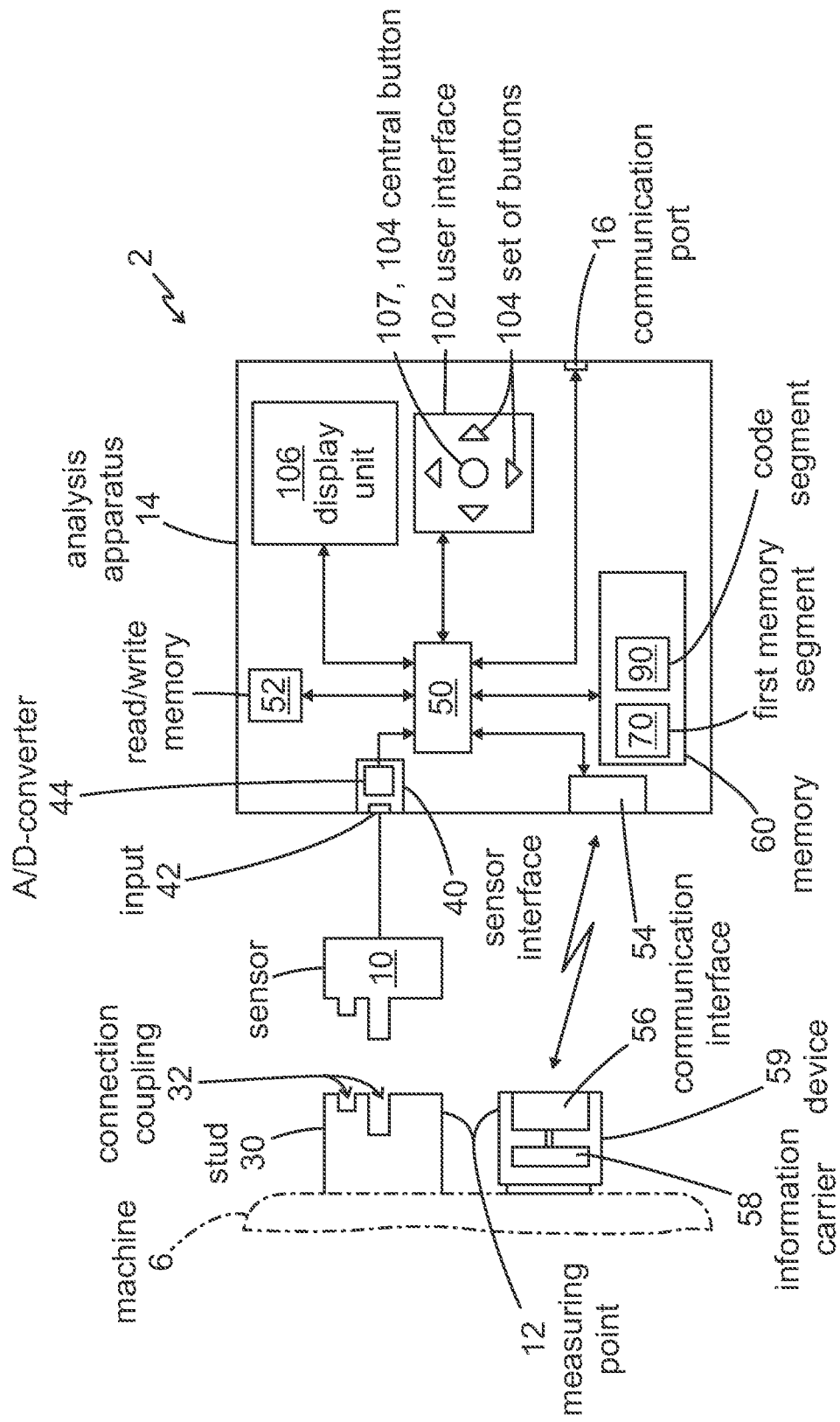
FIG. 2A is a schematic block diagram of an embodiment of a part of the condition analyzing system 2 shown in FIG. 1 including an embodiment of an analysis apparatus.

FIG. 2A is a schematic block diagram of an embodiment of a part of the condition analyzing system 2 shown in FIG. 1. The condition analyzing system, as illustrated in FIG. 2A, comprises a sensor unit 10 for producing a measured value.

The measured value may be dependent on movement or, more precisely, dependent on vibrations or shock pulses caused by bearings when the shaft rotates.

An embodiment of the condition analyzing system 2 is operative when a device 30 is firmly mounted on or at a measuring point on a machine 6. The device 30 mounted at the measuring point may be referred to as a stud 30. A stud 30 can comprise a connection coupling 32 to which the sensor unit 10 is removably attachable. The connection coupling 32 can, for example comprise double start threads for enabling the sensor unit to be mechanically engaged with the stud by means of a ¼ turn rotation.

A measuring point 12 can comprise a threaded recess in the casing of the machine. A stud 30 may have a protruding part with threads corresponding to those of the recess for enabling the stud to be firmly attached to the measuring point by introduction into the recess like a bolt.

Alternatively, a measuring point can comprise a threaded recess in the casing of the machine, and the sensor unit 10 may comprise corresponding threads so that it can be directly introduced into the recess. Alternatively, the measuring point is marked on the casing of the machine only with a painted mark.

The machine 6 exemplified in FIG. 2A may have a rotating shaft with a certain shaft diameter d1. The shaft in the machine 24 may rotate with a speed of rotation V1 when the machine 6 is in use.

The sensor unit 10 may be coupled to the apparatus 14 for analysing the condition of a machine. With reference to FIG. 2A, the analysis apparatus 14 comprises a sensor interface 40 for receiving a measured signal or measurement data, produced by the sensor 10. The sensor interface 40 is coupled to a data processing means 50 capable of controlling the operation of the analysis apparatus 14 in accordance with program code. The data processing means 50 is also coupled to a memory 60 for storing said program code.

According to an embodiment of the invention the sensor interface 40 comprises an input 42 for receiving an analogue signal, the input 42 being connected to an analogue-to-digital (A/D) converter 44, the digital output 48 of which is coupled to the data processing means 50. The A/D converter 44 samples the received analogue signal with a certain sampling frequency $f_S$ so as to deliver a digital measurement data signal $S_{MD}$ having said certain sampling frequency $f_S$ and wherein the amplitude of each sample depends on the amplitude of the received analogue signal at the moment of sampling.

Figure 2B:
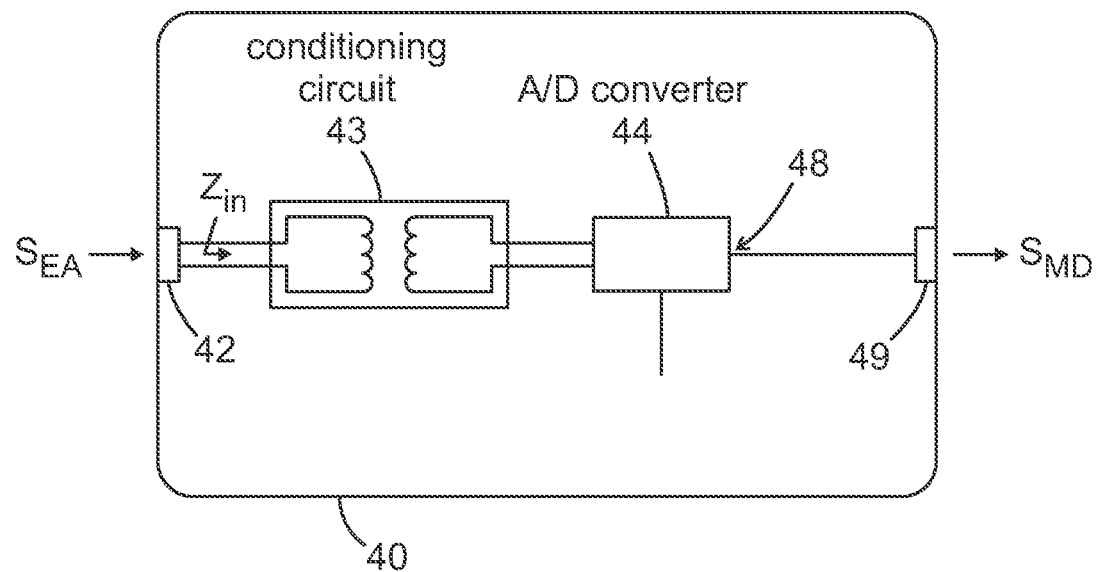
FIG. 2B is a schematic block diagram of an embodiment of a sensor interface.

According to another embodiment of the invention, illustrated in FIG. 2B, the sensor interface 40 comprises an input 42 for receiving an analogue signal $S_{EA}$ from a Shock Pulse Measurement Sensor, a conditioning circuit 43 coupled to receive the analogue signal, and an A/D converter 44 coupled to receive the conditioned analogue signal from the conditioning circuit 43. The A/D converter 44 samples the received conditioned analogue signal with a certain sampling frequency $f_S$ so as to deliver a digital measurement data signal $S_{MD}$ having said certain sampling frequency $f_S$ and wherein the amplitude of each sample depends on the amplitude of the received analogue signal at the moment of sampling.

The sampling theorem guarantees that bandlimited signals (i.e., signals which have a maximum frequency) can be reconstructed perfectly from their sampled version, if the sampling rate $f_S$ is more than twice the maximum frequency $f_{SEAmax}$ of the analogue signal $S_{EA}$ to be monitored. The frequency equal to one-half of the sampling rate is therefore a theoretical limit on the highest frequency that can be unambiguously represented by the sampled signal $S_{MD}$. This frequency (half the sampling rate) is called the Nyquist frequency of the sampling system. Frequencies above the Nyquist frequency $f_N$ can be observed in the sampled signal, but their frequency is ambiguous. That is, a frequency component with frequency f cannot be distinguished from other components with frequencies $B*f_N+f$, and $B*f_N-f$ for nonzero integers B. This ambiguity, known as aliasing may be handled by filtering the signal with an anti-aliasing filter (usually a low-pass filter with cutoff near the Nyquist frequency) before conversion to the sampled discrete representation.

In order to provide a safety margin for in terms of allowing a non-ideal filter to have a certain slope in the frequency response, the sampling frequency may be selected to a higher value than 2. Hence, according to embodiments of the invention the sampling frequency may be set to $$f_S = k * f_{SEAmax}$$

wherein k is a factor having a value higher than 2,0

Accordingly the factor k may be selected to a value higher than 2,0. Preferably factor k may be selected to a value between 2,0 and 2,9 in order to provide a good safety margin while avoiding to generate unnecessarily many sample values. According to an embodiment the factor k is advantageously selected such that 100*k/2 renders an integer. According to an embodiment the factor k may be set to 2,56. Selecting k to 2,56 renders 100*k=256=2 raised to 8.

According to an embodiment the sampling frequency $f_S$ of the digital measurement data signal $S_{MD}$ may be fixed to a certain value $f_S$, such as e.g. $f_S$=102 kHz Hence, when the sampling frequency $f_S$ is fixed to a certain value $f_S$, the maximum frequency $f_{SEAmax}$ of the analogue signal $S_{EA}$ will be:

$$f_{SEAmax} = f_S/k$$

wherein $f_{SEAmax}$ is the highest frequency to be analyzed in the sampled signal Hence, when the sampling frequency $f_S$ is fixed to a certain value $f_S$=102 400 Hz, and the factor k is set to 2,56, the maximum frequency $f_{SEAmax}$ of the analogue signal $S_{EA}$ will be:

$$f_{SEAmax} = f_S/k = 102\ 400/2,56 = 40\ \text{kHz}$$

Accordingly, a digital measurement data signal $S_{MD}$, having a certain sampling frequency $f_S$, is generated in response to said received analogue measurement signal $S_{EA}$. The digital output 48 of the A/D converter 44 is coupled to the data processing means 50 via an output 49 of the sensor interface 40 so as to deliver the digital measurement data signal $S_{MD}$ to the data processing means 50.

The sensor unit 10 may comprise a vibration transducer, the sensor unit being structured to physically engage the connection coupling of the measuring point so that vibrations of the machine at the measuring point are transferred to the vibration transducer. According to an embodiment of the invention the sensor unit comprises a transducer having a piezo-electric element. When the measuring point 12 vibrates, the sensor unit 10, or at least a part of it, also vibrates and the transducer then produces an electrical signal of which the frequency and amplitude depend on the mechanical vibration frequency and the vibration amplitude of the measuring point 12, respectively. According to an embodiment of the invention the sensor unit 10 is a vibration sensor, providing an analogue amplitude signal of e.g. 10 mV/g in the Frequency Range 1.00 to 10000 Hz. Such a vibration sensor is designed to deliver substantially the same amplitude of 10 mV irrespective of whether it is exerted to the acceleration of 1 g (9,82 m/s$^2$) at 1 Hz, 3 Hz or 10 Hz. Hence, a typical vibration sensor has a linear response in a specified frequency range up to around 10 kHz. Mechanical vibrations in that frequency range emanating from rotating machine parts are usually caused by imbalance or misalignment. However, when mounted on a machine the linear response vibration sensor typically also has several different mechanical resonance frequencies dependent on the physical path between sensor and vibration source.

A damage in a roller bearing may cause relatively sharp elastic waves, known as shock pulses, travelling along a physical path in the housing of a machine before reaching the sensor. Such shock pulses often have a broad frequency spectrum. The amplitude of a roller bearing shock pulse is typically lower than the amplitude of a vibration caused by imbalance or misalignment.

Figure 2C:
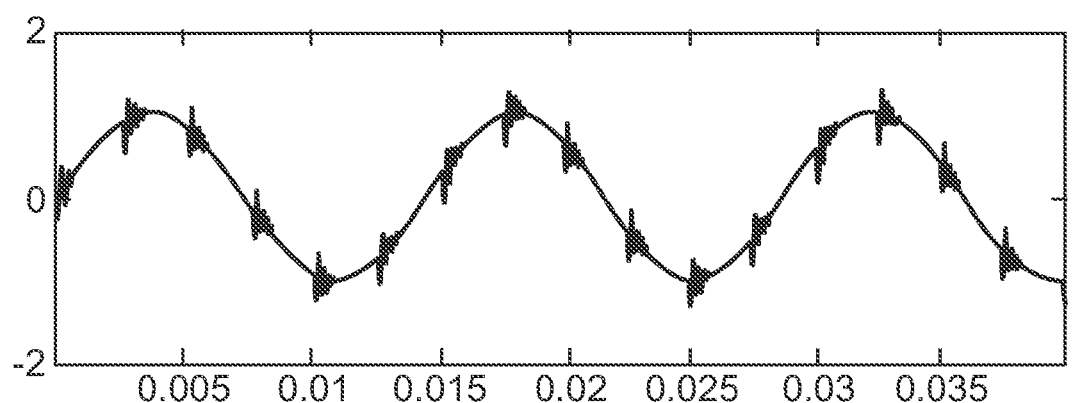
FIG. 2C is an illustration of a measuring signal from a vibration sensor.

The broad frequency spectrum of shock pulse signatures enables them to activate a "ringing response" or a resonance at a resonance frequency associated with the sensor. Hence, a typical measuring signal from a vibration sensor may have a wave form as shown in FIG. 2C, i.e. a dominant low frequency signal with a superimposed higher frequency lower amplitude resonant "ringing response".

In order to enable analysis of the shock pulse signature, often emanating from a bearing damage, the low frequency component must be filtered out. This can be achieved by means of a high pass filter or by means of a band pass filter. However, these filters must be adjusted such that the low frequency signal portion is blocked while the high frequency signal portion is passed on. An individual vibration sensor will typically have one resonance frequency associated with the physical path from one shock pulse signal source, and a different resonance frequency associated with the physical path from another shock pulse signal source, as mentioned in U.S. Pat. No. 6,053,047. Hence, filter adjustment aiming to pass the high frequency signal portion requires individual adaptation when a vibration sensor is used.

When such filter is correctly adjusted the resulting signal will consist of the shock pulse signature(s). However, the analysis of the shock pulse signature(s) emanating from a vibration sensor is somewhat impaired by the fact that the amplitude response as well as resonance frequency inherently varies dependent on the individual physical path from the shock pulse signal sources.

Advantageously, these drawbacks associated with vibration sensors may be alleviated by the use of a Shock Pulse Measurement sensor. The Shock Pulse Measurement sensor is designed and adapted to provide a pre-determined mechanical resonance frequency, as described in further detail below.

This feature of the Shock Pulse Measurement sensor advantageously renders repeatable measurement results in that the output signal from a Shock Pulse Measurement sensor has a stable resonance frequency substantially independent of the physical path between the shock pulse signal source and the shock pulse sensor. Moreover, mutually different individual shock pulse sensors provide a very small, if any, deviation in resonance frequency.

An advantageous effect of this is that signal processing is simplified, in that filters need not be individually adjusted, in contrast to the case described above when vibration sensors are used. Moreover, the amplitude response from shock pulse sensors is well defined such that an individual measurement provides reliable information when measurement is performed in accordance with appropriate measurement methods defined by S.P.M. Instrument AB.

Figure 2D:
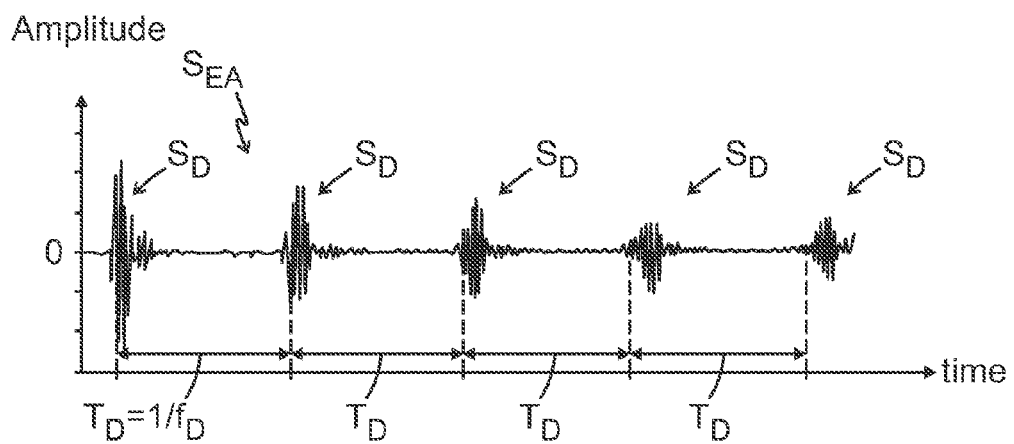
FIG. 2D illustrates a measuring signal amplitude generated by a shock pulse sensor.
Figure 2E:
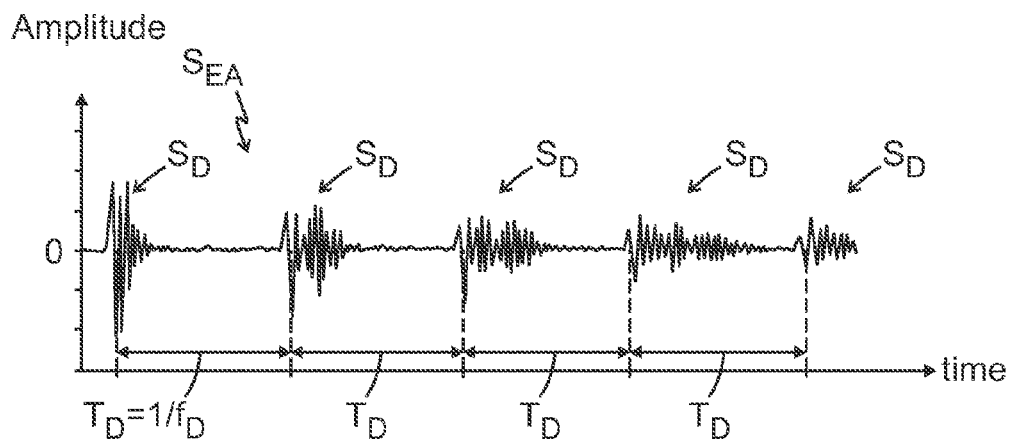
FIG. 2E illustrates a measuring signal amplitude generated by a vibration sensor.

FIG. 2D illustrates a measuring signal amplitude generated by a shock pulse sensor 10, and FIG. 2E illustrates a measuring signal amplitude generated by a vibration sensor 10. Both sensors have been exerted to the same series of mechanical shocks without the typical low frequency signal content. In FIGS. 2D and 2E, the vertical axes represent amplitude of an analogue electrical signal generated by the respective sensor, and the horizontal axes represent time. In both of FIGS. 2D and 2E, the respective analogue measurement signals $S_{EA}$ include a vibration signal signature $S_D$ having
- a vibration frequency $f_{SEA}$,
- at least one vibration signal repetition frequency $f_D$, being the inverse of the time period $T_D$ between two temporally adjacent vibration signal signatures $S_D$, and
- a vibration signal amplitude.

Figure 3:
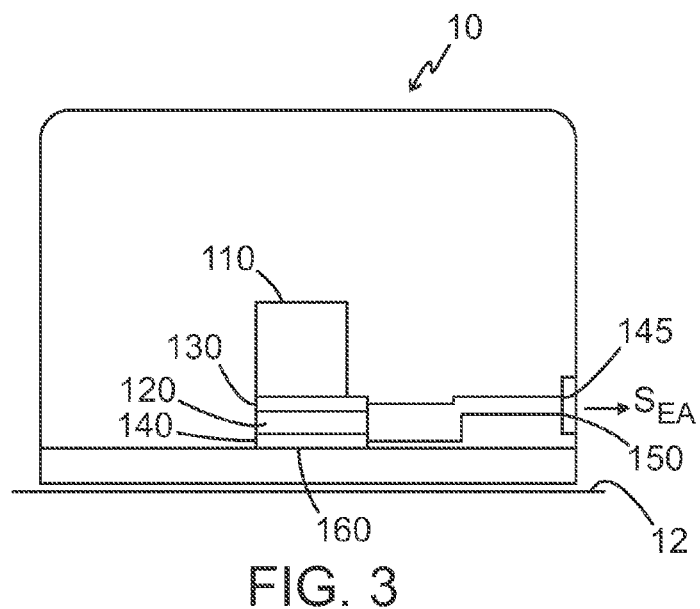
FIG. 3 is a simplified illustration of a Shock Pulse Measurement sensor according to an embodiment of the invention.

According to an embodiment of the invention the sensor is a Shock Pulse Measurement sensor. FIG. 3 is a simplified illustration of a Shock Pulse Measurement sensor 10 according to an embodiment of the invention. According to this embodiment the sensor comprises a part 110 having a certain mass or weight and a piezo-electrical element 120.

The piezo-electrical element 120 is somewhat flexible so that it can contract and expand when exerted to external force. The piezo-electrical element 120 is provided with electrically conducting layers 130 and 140, respectively, on opposing surfaces. As the piezo-electrical element 120 contracts and expands it generates an electric signal which is picked up by the conducting layers 130 and 140. Accordingly, a mechanical vibration is transformed into an analogue electrical measurement signal $S_{EA}$, which is delivered on output terminals 145, 150.

The piezo-electrical element 120 may be positioned between the weight 110 and a surface 160 which, during operation, is physically attached to the measuring point 12, as illustrated in FIG. 3.

The Shock Pulse Measurement sensor 10 has a resonance frequency that depends on the mechanical characteristics for the sensor, such as the mass m of weight part 110 and the resilience of piezo-electrical element 120. Hence, the piezo-electrical element has an elasticity and a spring constant k. The mechanical resonance frequency $f_{RM}$ for the sensor is therefore also dependent on the mass m and the spring constant k.

According to an embodiment of the invention the mechanical resonance frequency $f_{RM}$ for the sensor can be determined by the equation following equation:

$$f_{RM}=1/(2\pi)\sqrt{(k/m)} \tag{eq1}$$

According to another embodiment the actual mechanical resonance frequency for a Shock Pulse Measurement sensor 10 may also depend on other factors, such as the nature of the attachment of the sensor 10 to the body of the machine 6.

The resonant Shock Pulse Measurement sensor 10 is thereby particularly sensitive to vibrations having a frequency on or near the mechanical resonance frequency $f_{RM}$. The Shock Pulse Measurement sensor 10 may be designed so that the mechanical resonance frequency $f_{RM}$ is somewhere in the range from 28 kHz to 37 kHz. According to another embodiment the mechanical resonance frequency $f_{RM}$ is somewhere in the range from 30 kHz to 35 kHz.

Accordingly the analogue electrical measurement signal has an electrical amplitude which may vary over the frequency spectrum. For the purpose of describing the theoretical background, it may be assumed that if the Shock Pulse Measurement sensor 10 were exerted to mechanical vibrations with identical amplitude in all frequencies from e.g. 1 Hz to e.g. 200 000 kHz, then the amplitude of the analogue signal $S_{EA}$ from the Shock Pulse Measurement Sensor will have a maximum at the mechanical resonance frequency $f_{RM}$, since the sensor will resonate when being "pushed" with that frequency.

With reference to FIG. 2B, the conditioning circuit 43 receives the analogue signal $S_{EA}$. The conditioning circuit 43 may be designed to be an impedance adaption circuit designed to adapt the input impedance of the A/D-converter as seen from the sensor terminals 145,150 so that an optimum signal transfer will occur. Hence, the conditioning circuit 43 may operate to adapt the input impedance $Z_{in}$ as seen from the sensor terminals 145,150 so that a maximum electric power is delivered to the A/D-converter 44. According to an embodiment of the conditioning circuit 43 the analogue signal $S_{EA}$ is fed to the primary winding of a transformer, and a conditioned analogue signal is delivered by a secondary winding of the transformer. The primary winding has n1 turns and the secondary winding has n2 turns, the ratio $n1/n2=n_{12}$. Hence, the A/D converter 44 is coupled to receive the conditioned analogue signal from the conditioning circuit 43. The A/D converter 44 has an input impedance $Z_{44}$, and the input impedance of the A/D-converter as seen from the sensor terminals 145,150 will be $(n1/n2)^2 * Z_{44}$, when the conditioning circuit 43 is coupled in between the sensor terminals 145,150 and the input terminals of the A/D converter 44.

The A/D converter 44 samples the received conditioned analogue signal with a certain sampling frequency $f_S$ so as to deliver a digital measurement data signal $S_{MD}$ having said certain sampling frequency $f_S$ and wherein the amplitude of each sample depends on the amplitude of the received analogue signal at the moment of sampling.

Figure 5:
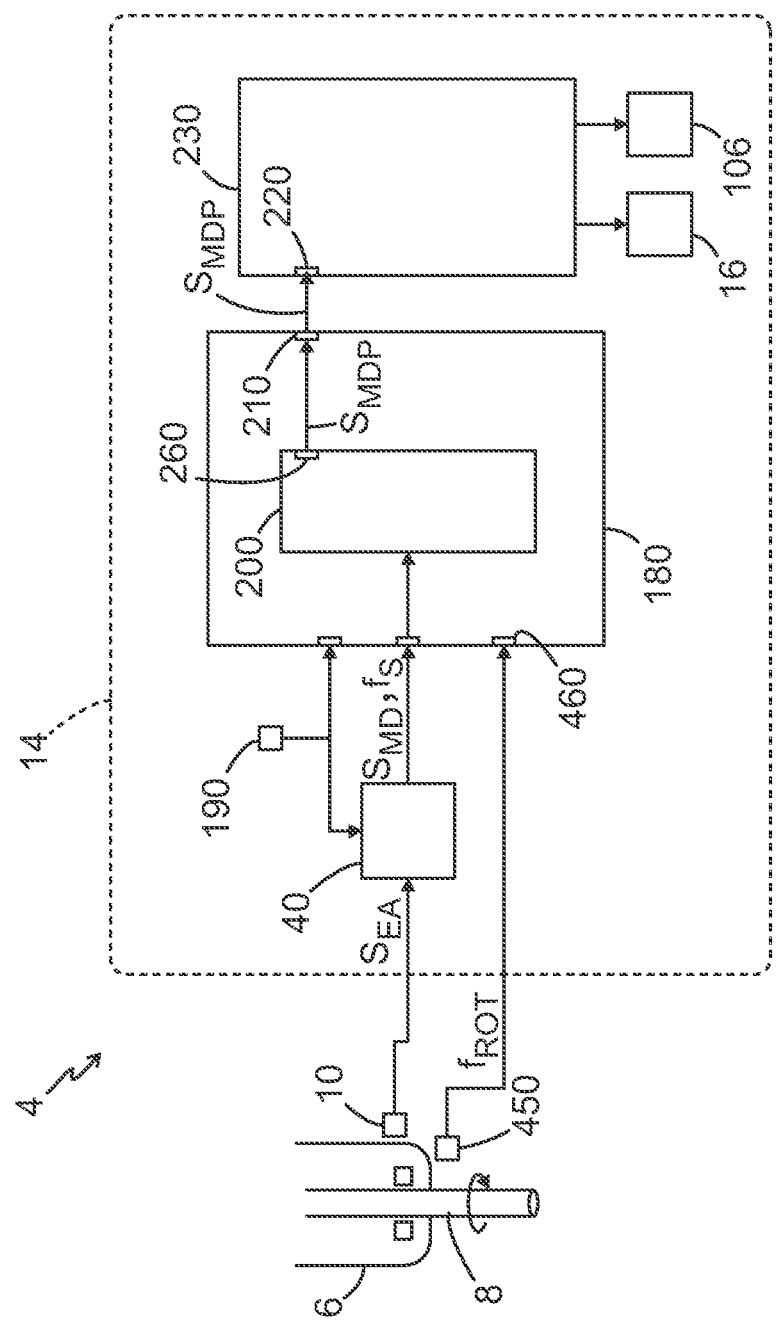
FIG. 5 is a schematic block diagram of an embodiment of the analysis apparatus at a client location with a machine 6 having a movable shaft.

According to embodiments of the invention the digital measurement data signal $S_{MD}$ is delivered to a means 180 for digital signal processing (See FIG. 5).

According to an embodiment of the invention the means 180 for digital signal processing comprises the data processor 50 and program code for causing the data processor 50 to perform digital signal processing. According to an embodiment of the invention the processor 50 is embodied by a Digital Signal Processor. The Digital Signal Processor may also be referred to as a DSP.

Figure 4:
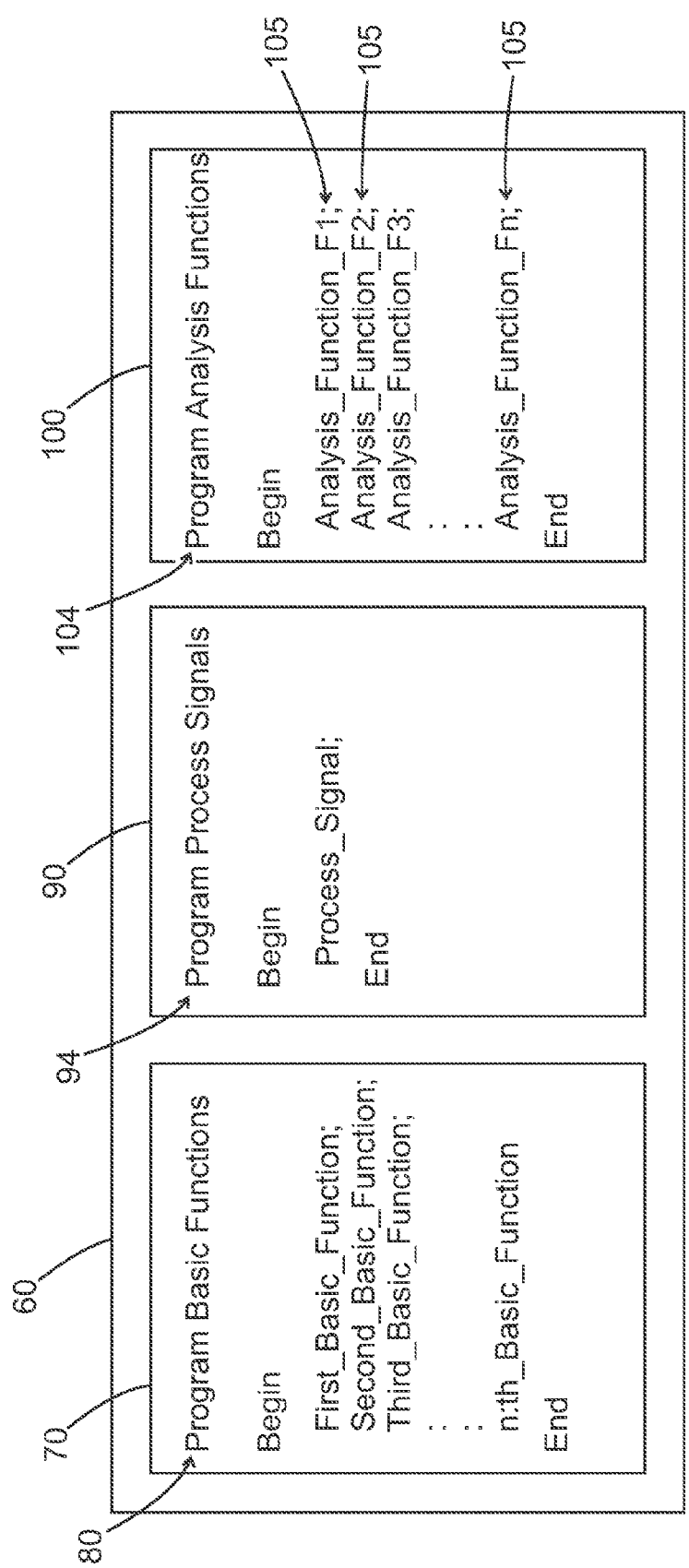
FIG. 4 is a simplified illustration of an embodiment of the memory 60 and its contents.

With reference to FIG. 2A, the data processing means 50 is coupled to a memory 60 for storing said program code. The program memory 60 is preferably a non-volatile memory. The memory 60 may be a read/write memory, i.e. enabling both reading data from the memory and writing new data onto the memory 60. According to an embodiment the program memory 60 is embodied by a FLASH memory. The program memory 60 may comprise a first memory segment 70 for storing a first set of program code 80 which is executable so as to control the analysis apparatus 14 to perform basic operations (FIG. 2A and FIG. 4). The program memory may also comprise a second memory segment 90 for storing a second set of program code 94. The second set of program code 94 in the second memory segment 90 may include program code for causing the analysis apparatus to process the detected signal, or signals, so as to generate a pre-processed signal or a set of pre-processed signals. The memory 60 may also include a third memory segment 100 for storing a third set of program code 104. The set of program code 104 in the third memory segment 100 may include program code for causing the analysis apparatus to perform a selected analysis function 105. When an analysis function is executed it may cause the analysis apparatus to present a corresponding analysis result on user interface 106 or to deliver the analysis result on port 16 (See FIG. 1 and FIG. 2A and FIG. 7).

The data processing means 50 is also coupled to a read/write memory 52 for data storage. Moreover, the data processing means 50 may be coupled to an analysis apparatus communications interface 54. The analysis apparatus communications interface 54 provides for bi-directional communication with a measuring point communication interface 56 which is attachable on, at or in the vicinity of the measuring point on the machine.

The measuring point 12 may comprise a connection coupling 32, a readable and writeable information carrier 58, and a measuring point communication interface 56.

The writeable information carrier 58, and the measuring point communication interface 56 may be provided in a separate device 59 placed in the vicinity of the stud 30, as illustrated in FIG. 2. Alternatively the writeable information carrier 58, and the measuring point communication interface 56 may be provided within the stud 30. This is described in more detail in WO 98/01831, the content of which is hereby incorporated by reference.

The system 2 is arranged to allow bidirectional communication between the measuring point communication interface 56 and the analysis apparatus communication interface 54. The measuring point communication interface 56 and the analysis apparatus communication interface 54 are preferably constructed to allow wireless communication. According to an embodiment the measuring point communication interface and the analysis apparatus communication interface are constructed to communicate with one another by radio frequency (RF) signals. This embodiment includes an antenna in the measuring point communication interface 56 and another antenna the analysis apparatus communication interface 54.

FIG. 4 is a simplified illustration of an embodiment of the memory 60 and its contents. The simplified illustration is intended to convey understanding of the general idea of storing different program functions in memory 60, and it is not necessarily a correct technical teaching of the way in which a program would be stored in a real memory circuit. The first memory segment 70 stores program code for controlling the analysis apparatus 14 to perform basic operations. Although the simplified illustration of FIG. 4 shows pseudo code, it is to be understood that the program code 80 may be constituted by machine code, or any level program code that can be executed or interpreted by the data processing means 50 (FIG. 2A).

The second memory segment 90, illustrated in FIG. 4, stores a second set of program code 94. The program code 94 in segment 90, when run on the data processing means 50, will cause the analysis apparatus 14 to perform a function, such as a digital signal processing function. The function may comprise an advanced mathematical processing of the digital measurement data signal $S_{MD}$. According to embodiments of the invention the program code 94 is adapted to cause the processor means 50 to perform signal processing functions described in connection with FIGS. 5, 6, 9, 10, 11A, 11B, 12A, 12B, 13A-C, 14A, 14B, 15A and/or FIG. 16 in this document.

As mentioned above in connection with FIG. 1, a computer program for controlling the function of the analysis apparatus may be downloaded from the server computer 20. This means that the program-to-be-downloaded is transmitted to over the communications network 18. This can be done by modulating a carrier wave to carry the program over the communications network 18. Accordingly the downloaded program may be loaded into a digital memory, such as memory 60 (See FIGS. 2A and 4). Hence, a signal processing program 94 and or an analysis function program 104, 105 may be received via a communications port, such as port 16 (FIGS. 1 & 2A), so as to load it into memory 60. Similarly, a signal processing program 94 and or an analysis function program 104, 105 may be received via communications port 29B (FIG. 1), so as to load it into a program memory location in computer 26B or in database 22B.

An aspect of the invention relates to a computer program product, such as a program code means 94 and/or program code means 104, 105 loadable into a digital memory of an apparatus. The computer program product comprising software code portions for performing signal processing methods and/or analysis functions when said product is run on a data processing unit 50 of an apparatus for analysing the condition of a machine. The term "run on a data processing unit" means that the computer program plus the data processing unit carries out a method of the kind described in this document.

The wording "a computer program product, loadable into a digital memory of a condition analysing apparatus" means that a computer program can be introduced into a digital memory of a condition analysing apparatus so as achieve a condition analysing apparatus programmed to be capable of, or adapted to, carrying out a method of the kind described above. The term "loaded into a digital memory of a condition analysing apparatus" means that the condition analysing apparatus programmed in this way is capable of, or adapted to, carrying out a method of the kind described above.

The above mentioned computer program product may also be loadable onto a computer readable medium, such as a compact disc or DVD. Such a computer readable medium may be used for delivery of the program to a client.

According to an embodiment of the analysis apparatus 14 (FIG. 2A), it comprises a user input interface 102, whereby an operator may interact with the analysis apparatus 14. According to an embodiment the user input interface 102 comprises a set of buttons 104. An embodiment of the analysis apparatus 14 comprises a user output interface 106. The user output interface may comprise a display unit 106. The data processing means 50, when it runs a basic program function provided in the basic program code 80, provides for user interaction by means of the user input interface 102 and the display unit 106. The set of buttons 104 may be limited to a few buttons, such as for example five buttons, as illustrated in FIG. 2A. A central button 107 may be used for an ENTER or SELECT function, whereas other, more peripheral buttons may be used for moving a cursor on the display 106.

In this manner it is to be understood that symbols and text may be entered into the apparatus 14 via the user interface. The display unit 106 may, for example, display a number of symbols, such as the letters of alphabet, while the cursor is movable on the display in response to user input so as to allow the user to input information.

FIG. 5 is a schematic block diagram of an embodiment of the analysis apparatus 14 at a client location 4 with a machine 6 having a movable shaft 8. The sensor 10, which may be a Shock Pulse Measurement Sensor, is shown attached to the body of the machine 6 so as to pick up mechanical vibrations and so as to deliver an analogue measurement signal $S_{EA}$ indicative of the detected mechanical vibrations to the sensor interface 40. The sensor interface 40 may be designed as described in connection with FIG. 2A or 2B. The sensor interface 40 delivers a digital measurement data signal $S_{MD}$ to a means 180 for digital signal processing.

The digital measurement data signal $S_{MD}$ has a sampling frequency $f_S$, and the amplitude value of each sample depends on the amplitude of the received analogue measurement signal $S_{EA}$ at the moment of sampling. According to an embodiment the sampling frequency $f_S$ of the digital measurement data signal $S_{MD}$ may be fixed to a certain value $f_S$, such as e.g. $f_S=102\,400$ Hz. The sampling frequency $f_S$ may be controlled by a clock signal delivered by a clock 190, as illustrated in FIG. 5. The clock signal may also be delivered to the means 180 for digital signal processing. The means 180 for digital signal processing can produce information about the temporal duration of the received digital measurement data signal $S_{MD}$ in response to the received digital measurement data signal $S_{MD}$, the clock signal and the relation between the sampling frequency $f_S$ and the clock signal, since the duration between two consecutive sample values equals $T_s=1/f_S$.

According to embodiments of the invention the means 180 for digital signal processing includes a pre-processor 200 for performing a pre-processing of the digital measurement data signal $S_{MD}$ so as to deliver a pre-processed digital signal $S_{MDP}$ on an output 210. The output 210 is coupled to an input 220 of an evaluator 230. The evaluator 230 is adapted to evaluate the pre-processed digital signal $S_{MDP}$ so as to deliver a result of the evaluation to a user interface 106. Alternatively the result of the evaluation may be delivered to a communication port 16 so as to enable the transmission of the result e.g. to a control computer 33 at a control site 31 (See FIG. 1).

According to an embodiment of the invention, the functions described in connection with the functional blocks in means 180 for digital signal processing, pre-processor 200 and evaluator 230 may be embodied by computer program code 94 and/or 104 as described in connection with memory blocks 90 and 100 in connection with FIG. 4 above.

A user may require only a few basic monitoring functions for detection of whether the condition of a machine is normal or abnormal. On detecting an abnormal condition, the user may call for specialized professional maintenance personnel to establish the exact nature of the problem, and for performing the necessary maintenance work. The professional maintenance personnel frequently needs and uses a broad range of evaluation functions making it possible to establish the nature of, and/or cause for, an abnormal machine condition. Hence, different users of an analysis apparatus 14 may pose very different demands on the function of the apparatus. The term Condition Monitoring function is used in this document for a function for detection of whether the condition of a machine is normal or somewhat deteriorated or abnormal. The term Condition Monitoring function also comprises an evaluation function making it possible to establish the nature of, and/or cause for, an abnormal machine condition.

Examples of Machine Condition Monitoring Functions

The condition monitoring functions F1, F2 . . . Fn includes functions such as:

vibration analysis, shock pulse measuring, Peak level analysis, spectrum analysis of shock pulse measurement data, Fast Fourier Transformation of vibration measurement data, graphical presentation of condition data on a user interface, storage of condition data in a writeable information carrier on said machine, storage of condition data in a writeable information carrier in said apparatus, tachometering, imbalance detection, and misalignment detection.

According to an embodiment the apparatus 14 includes the following functions:

F1 = vibration analysis;
F2 = shock pulse measuring,
F3 = Peak level analysis
F4 = spectrum analysis of shock pulse measurement data,
F5 = Fast Fourier Transformation of vibration measurement data,
F6 = graphical presentation of condition data on a user interface,
F7 = storage of condition data in a writeable information carrier on said machine,
F8 = storage of condition data in a writeable information carrier 52 in said apparatus,
F9 = tachometering,
F10 = imbalance detection, and
F11 = misalignment detection.
F12 = Retrieval of condition data from a writeable information carrier 58 on said machine.
F13 = Performing Peak level analysis F3 and performing function F12 "Retrieval of condition data from a writeable information carrier 58 on said machine" so as to enable a comparison or trending based on current Peak level data and historical Peak level data.
F14 = Retrieval of identification data from a writeable information carrier 58 on said machine.

Embodiments of the function F7 "storage of condition data in a writeable information carrier on said machine", and F13 vibration analysis and retrieval of condition data is described in more detail in WO 98/01831, the content of which is hereby incorporated by reference.

The peak level analysis F3 may be performed on the basis of the enveloped time domain signal $S_{ENV}$ delivered by an enveloper 250. The signal $S_{ENV}$ is also referred to as $S_{MDP}$.

The peak level analysis F3 is adapted to monitor the signal for the duration of a peak monitoring period $T_{PM}$ for the purpose of establishing the maximum amplitude level.

The peak amplitude may be indicative of Oil film thickness in a monitored bearing. Hence, the detected peak amplitude may be indicative of separation between the metal surfaces in the rolling interface. The oil film thickness may depend on lubricant supply and/or on alignment of the shaft. Moreover, the oil film thickness may depend on the load on the shaft, i.e. on the force with which metal surfaces are pressed together, the metal surfaces being e.g. that of a bearing and that of a shaft.

The actual detected value of the maximum amplitude level may also depend on the mechanical state of the bearing surfaces, .i.e the condition of the bearing assembly. Accordingly, the detected value of the maximum amplitude level may depend on roughness of the metal surfaces in the rolling interface, and/or damage to a metal surface in the rolling interface. The detected value of the maximum amplitude level may also depend on the occurrence of a loose particle in the bearing assembly.

Figure 6A:
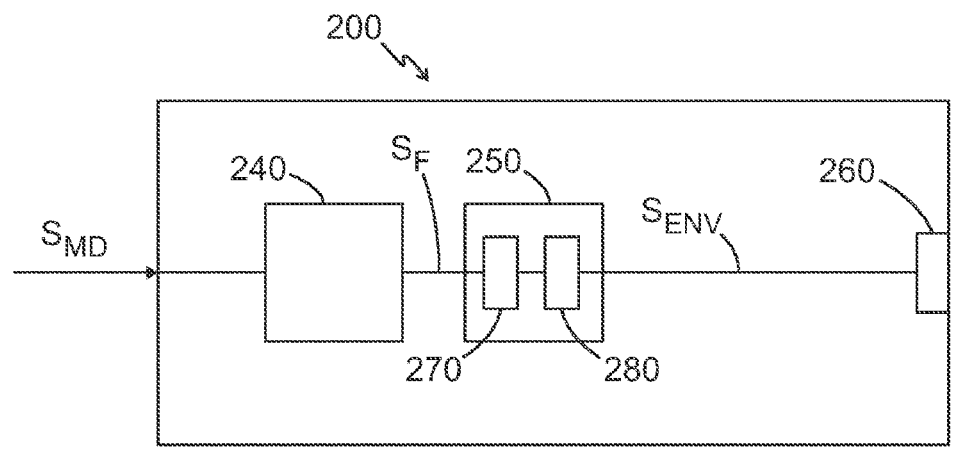
FIG. 6A illustrates a schematic block diagram of an embodiment of the pre-processor according to an embodiment of the present invention.

FIG. 6A illustrates a schematic block diagram of an embodiment of the pre-processor 200 according to an embodiment of the present invention. In this embodiment the digital measurement data signal $S_{MD}$ is coupled to a digital band pass filter 240 having a lower cutoff frequency $f_{LC}$, an upper cutoff frequency $f_{UC}$ and passband bandwidth between the upper and lower cutoff frequencies.

The output from the digital band pass filter 240 is connected to a digital enveloper 250. According to an embodiment of the invention the signal output from the enveloper 250 is delivered to an output 260. The output 260 of the pre-processor 200 is coupled to output 210 of digital signal processing means 180 for delivery to the input 220 of evaluator 230.

The upper and lower cutoff frequencies of the digital band pass filter 240 may selected so that the frequency components of the signal $S_{MD}$ at the resonance frequency $f_{RM}$ for the sensor are in the passband bandwidth. As mentioned above, an amplification of the mechanical vibration is achieved by the sensor being mechanically resonant at the resonance frequency $f_{RM}$. Accordingly the analogue measurement signal $S_{EA}$ reflects an amplified value of the vibrations at and around the resonance frequency $f_{RM}$. Hence, the band pass filter according to the FIG. 6 embodiment advantageously suppresses the signal at frequencies below and above resonance frequency $f_{RM}$, so as to further enhance the components of the measurement signal at the resonance frequency $f_{RM}$. Moreover, the digital band pass filter 240 advantageously further reduces noise inherently included in the measurement signal, since any noise components below the lower cutoff frequency $f_{LC}$, and above upper cutoff frequency $f_{UC}$ are also eliminated or reduced. Hence, when using a resonant Shock Pulse Measurement sensor 10 having a mechanical resonance frequency $f_{RM}$ in a range from a lowest resonance frequency value $f_{RML}$ to a highest resonance frequency value $f_{RMU}$ the digital band pass filter 240 may be designed to having a lower cutoff frequency $f_{LC}=f_{RML}$, and an upper cutoff frequency $f_{UC}=f_{RMU}$. According to an embodiment the lower cutoff frequency $f_{LC}=f_{RML}=28$ kHz, and the upper cutoff frequency $f_{UC}=f_{RMU}=37$ kHz.

According to another embodiment the mechanical resonance frequency $f_{RM}$ is somewhere in the range from 30 kHz to 35 kHz, and the digital band pass filter 240 may then be designed to having a lower cutoff frequency $f_{LC}=30$ kHz and an upper cutoff frequency $f_{UC}=35$ kHz.

According to another embodiment the digital band pass filter 240 may be designed to have a lower cutoff frequency $f_{LC}$ being lower than the lowest resonance frequency value $f_{RM}$, and an upper cutoff frequency $f_{UC}$ being higher than the highest resonance frequency value $f_{RMU}$. For example the mechanical resonance frequency $f_{RM}$ may be a frequency in the range from 30 kHz to 35 kHz, and the digital band pass filter 240 may then be designed to having a lower cutoff frequency $f_{LC}=17$ kHz, and an upper cutoff frequency $f_{UC}=36$ kHz.

Accordingly, the digital band pass filter 240 may deliver a passband digital measurement data signal $S_F$ having an advantageously low out-of-band noise content and reflecting mechanical vibrations in the passband. The passband digital measurement data signal $S_F$ may be delivered to an enveloper 250.

The digital enveloper 250 accordingly receives the passband digital measurement data signal $S_F$ which may reflect a signal having positive as well as negative amplitudes. With reference to FIG. 6A, the received signal is rectified by a digital rectifier 270, and the rectified signal may be filtered by an optional low pass filter 280 so as to produce a digital envelop signal $S_{ENV}$.

Accordingly, the signal $S_{ENV}$ is a digital representation of an envelope signal being produced in response to the filtered measurement data signal $S_F$. According to some embodiments of the invention the optional low pass filter 280 may be eliminated.

According to the FIG. 6A embodiment of the invention the signal $S_{ENV}$ is delivered to the output 260 of pre-processor 200. Hence, according to an embodiment of the invention the pre-processed digital signal $S_{MDP}$ delivered on the output 210 (FIG. 5) is the digital envelop signal $S_{ENV}$.

Whereas prior art analogue devices for generating an envelop signal in response to a measurement signal employs an analogue rectifier which inherently leads to a biasing error being introduced in the resulting signal, the digital enveloper 250 will advantageously produce a true rectification without any biasing errors. Accordingly, the digital envelop signal $S_{ENV}$ will have a good Signal-to-Noise Ratio, since the sensor being mechanically resonant at the resonance frequency in the passband of the digital band pass filter 240 leads to a high signal amplitude and the signal processing being performed in the digital domain eliminates addition of noise and eliminates addition of biasing errors.

With reference to FIG. 5 the pre-processed digital signal $S_{MDP}$ is delivered to input 220 of the evaluator 230.

According to another embodiment, the filter 240 is a high pass filter having a cut-off frequency $f_{LC}$. This embodiment simplifies the design by replacing the band-pass filter with a high-pass filter 240, thereby leaving the low pass filtering to another low pass filter downstream, such as the low pass filter 280. The cut-off frequency $f_{LC}$ of the high pass filter 240 is selected to approximately the value of the lowest expected mechanical resonance frequency value $f_{RMU}$ of the resonant Shock Pulse Measurement sensor 10. When the mechanical resonance frequency $f_{RM}$ is somewhere in the range from 30 kHz to 35 kHz, the high pass filter 240 may be designed to having a lower cutoff frequency $f_{LC}$=30 kHz. The high-pass filtered signal is then passed to the rectifier 270 and on to the low pass filter 280. According to an embodiment it should be possible to use sensors 10 having a resonance frequency somewhere in the range from 20 kHz to 35 kHz. In order to achieve this, the high pass filter 240 may be designed to having a lower cutoff frequency $f_{LC}$=20 kHz.

Figure 6B:
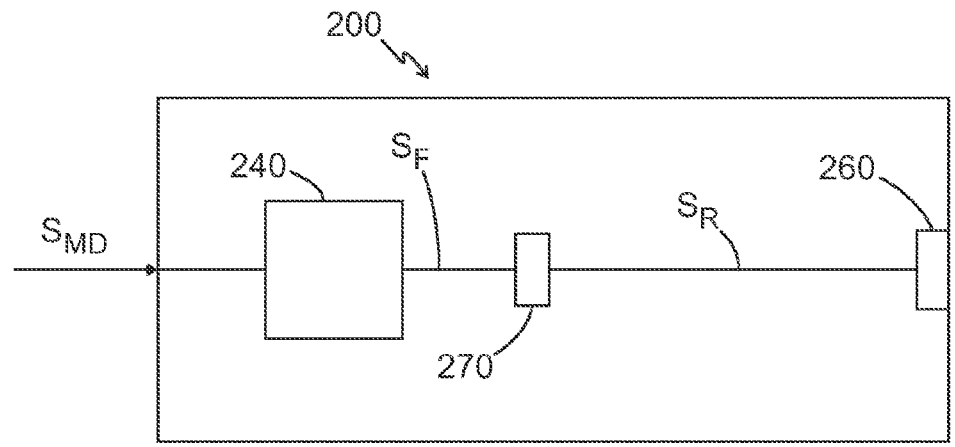
FIG. 6B illustrates an embodiment of the pre-processor including a digital rectifier.
Figure 7:
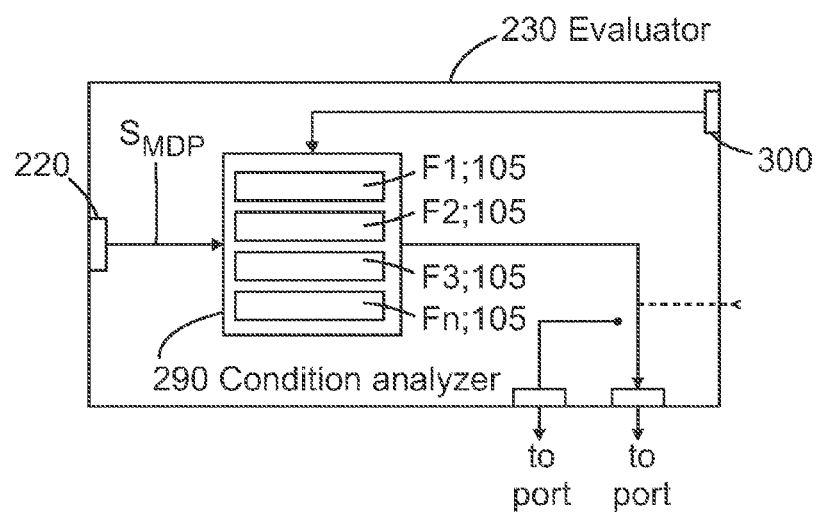
FIG. 7 illustrates an embodiment of the evaluator.

FIG. 6B illustrates an embodiment according to which the digital band pass filter 240 delivers the filtered signal $S_F$ to the digital rectifier 270, and the rectifier 270 delivers the rectified signal $S_R$ directly to a condition analyzer 290 (See FIG. 7 in conjunction with FIG. 6B).

FIG. 7 illustrates an embodiment of the evaluator 230 (See also FIG. 5). The FIG. 7 embodiment of the evaluator 230 includes the condition analyser 290 adapted to receive a pre-processed digital signal $S_{MDP}$ indicative of the condition of the machine 6. The condition analyser 290 can be controlled to perform a selected condition analysis function 105 by means of a selection signal delivered on a control input 300. Examples of condition analysis functions 105 are schematically illustrated as boxes in FIG. 7. The selection signal delivered on control input 300 may be generated by means of user interaction with the user interface 102 (See FIG. 2A).

As mentioned above, the analysis apparatus 14 may include a Peak level analysis function F3, 105 (See FIG. 4 & FIG. 7).

According to an embodiment of the invention the Peak level analysis function may be performed by the condition analyser 290 in response to activation via control input 300. In response to the peak level analysis activation signal, the analyzer 290 will activate a peak level analyzer F3, 105 (See FIG. 7), and the digital measurement signal SMDP will be passed to an input of the peak level analyzer F3, 105.

The peak level analyzer F3, 105 is adapted to monitor the signal for a variably settable duration (TMeas) of a measuring session for the purpose of collecting a number of peak amplitude values.

As mentioned above, the peak amplitude detected in the measurement signal may, when the peak amplitude value originates from a mechanical vibration in the monitored machine, be indicative of the condition of the machine. When a bearing assembly is monitored, the peak amplitude value may be indicative of the condition of the bearing assembly. In fact, the peak amplitude value may be indicative of Oil film thickness in a monitored bearing. Hence, the detected peak amplitude may be indicative of separation between the metal surfaces in the rolling interface. The oil film thickness may depend on lubricant supply and/or on alignment of the shaft. Moreover, the oil film thickness may depend on the load on the shaft, i.e. on the force with which metal surfaces are pressed together, the metal surfaces being e.g. that of a bearing and that of a shaft. The actual detected value of the peak amplitude levels may also depend on the mechanical state of the bearing surfaces. The rotation of the rotatable machine part may cause a mechanical vibration $V_{MD}$ indicative of a deteriorated condition in that rotatable machine part.

Tests have indicated that the detected peak amplitude levels for a rotational part often varies, i.e. each revolution of a rotational shaft does not produce identical peak levels. After careful study of such amplitude levels the inventor concluded that the amplitude levels emanating from rotation of a monitored rotational part closely follow the normal distribution, also referred to as the Gaussian distribution; and that it is advantageous to record the amplitude levels during an uninterrupted variably settable duration $T_{Meas}$, preferably longer than one second, in order to collect a number of peak amplitude values which may be used for a reliable determination of the condition of the monitored rotational part. According to a preferred embodiment the variably settable duration $T_{Meas}$ is longer than 1,3 seconds. According to an embodiment, the variably settable duration $T_{Meas}$ is longer than three seconds when switch 909B is also operated so as to concurrently produce a transformed signal.

In this context, it should be noted that the normal distribution is a probability distribution that describes data that cluster around the mean. The graph of the associated probability density function is bell-shaped, with a peak at the mean, and is known as the Gaussian function or bell curve.

Figure 8:
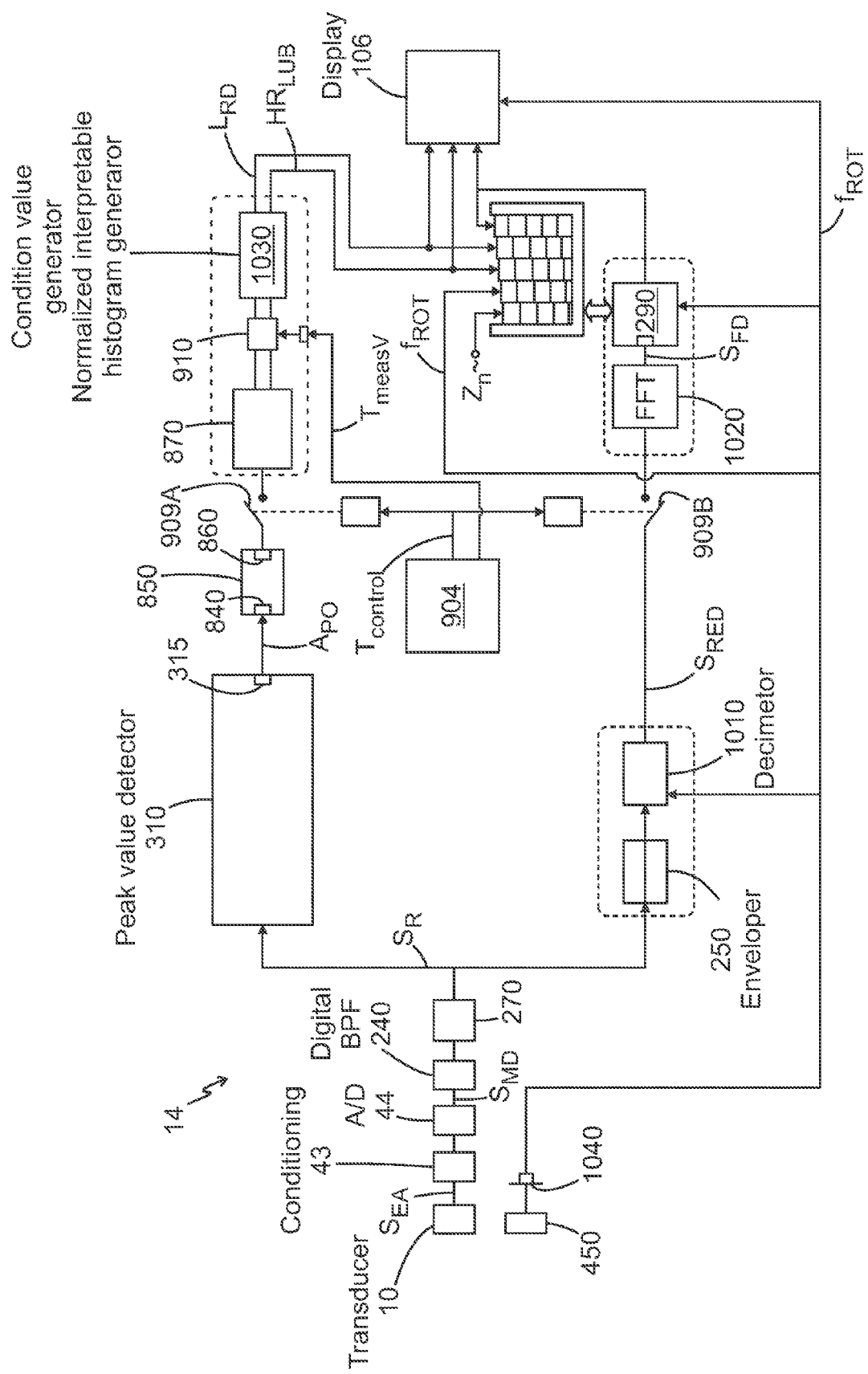
FIG. 8 is a schematic block diagram of an embodiment of the analysis apparatus

FIG. 8 is a schematic block diagram illustrating an improved apparatus 14. The illustrated apparatus 14 includes a transducer 10 for converting mechanical vibrations in a bearing to analogue electrical oscillations $S_{EA}$. The presently preferred transducer may comprise a resonant piezoelectric accelerometer, as described above in this document. The analogue signal $S_{EA}$ from the transducer 10 may be delivered to a conditioning circuit 43 which may be coupled to receive the analogue signal $S_{EA}$, and an A/D converter 44 may be coupled to receive the conditioned analogue signal from the conditioning circuit 43. The A/D converter 44 samples the received conditioned analogue signal with a certain sampling frequency $f_S$ so as to deliver a digital measurement data signal $S_{MD}$ having said certain sampling frequency $f_S$ and wherein the amplitude of each sample depends on the amplitude of the received analogue signal at the moment of sampling.

The digital measurement data signal $S_{MD}$ may be filtered, e.g. by a digital filter 240, so that the resulting signal has an upper frequency limit value corresponding to an upper cutoff filter frequency $f_{UC}$. The digital filter 240 may be a digital band pass filter 240 as described in connection with FIG. 6A and/or FIG. 6B.

A digital rectifier 270 may be provided to perform a rectification of the digital signal so as to generate a rectified digital signal $S_R$ dependent on said digital measurement signal $S_{MD}$. According to a preferred embodiment the digital rectifier 270 is adapted to perform a full-wave rectification so as to generate a rectified digital signal $S_R$ dependent on said digital measurement signal $S_{MD}$ including absolute values of the resulting sequence of sample values.

A digital peak value detector 310 may be adapted to generate output peak values $A_{PO}$ on an output 315 dependent on said sequence of sample values $S_{MD}$, $S_R$.

The detected signal peaks or detected signal peak values $A_{PO}$ may be delivered from the peak detector output 315 to an input 840 of a log generator 850. The log generator 850 is adapted to generate the logarithmic amplitude values corresponding to the amplitude of the received detected signal peaks or detected signal peak values $A_{PO}$. Hence, an output 860 of log generator 850 is adapted to deliver logarithmic amplitude values.

A value sorter 870, also referred to as peak value discriminator 870, is adapted to receive the logarithmic amplitude values and to sort the received the logarithmic amplitude values into amplitude bins corresponding to the received logarithmic amplitude values during a measuring session. Hence, the value sorter 870 may be adapted to deliver sorted amplitude values $A_{PO}$, e.g. in the form of a table 470 at the end of a measuring session. The table 470 may be a table histogram 470 and/or cumulative histogram table 530, as discussed and illustrated in connection with FIGS. 9 and/or 11 below.

A measuring session controller 904 may be provided to control a variably settable duration $T_{Meas}$ of the measuring session. The measuring session controller 904 may provide a control signal $T_{control}$ so as to turn on switches 909A and 909B simultaneously, or substantially simultaneously, and so as to turn off the switches 909A and 909B simultaneously, or substantially simultaneously. In such a manner the switches 909A and 909B may be switched on at the start of the measuring session duration $T_{Meas}$, and the switches 909A and 909B may be switched off at the end of the measuring session duration $T_{Meas}$. In this manner the peak value discriminator 870 will operate for the duration of the measuring session duration $T_{Meas}$, and at the end of the measuring session duration $T_{Meas}$ the relevant time value $T_{MeasV}$, counted e.g. as an amount of seconds, is stored in association with the table 470.

The measuring session duration $T_{Meas}$ may be settable by a user via the user interface. Alternatively, the measuring session duration $T_{Meas}$ may be settable in dependence on the duration necessary for obtaining a desired frequency resolution by the Fast Fourier Transformer 1020.

FIG. 9 is a schematic illustration of plural memory positions arranged as a table 470, and suitable for storage of data to be collected. The table 470 may be stored in the memory 52 (FIG. 2A) or in a memory internal to the processor 50.

FIG. 10 illustrates a histogram having plural amplitude bins 500, each amplitude bin representing an amplitude level $A_r$. The number of amplitude bins may be set to a suitable number by the user, via user interface 102 (FIG. 2A). FIG. 10 illustrates a number of amplitude bins along one axis 480, and occurrence of detected peak amplitude values along another axis 490. However, in the illustration of FIG. 10 no values have been plotted in the histogram. The amplitude axis 480 may have a certain resolution, which may also be settable by the user, via the user interface 102. Alternatively the resolution of the amplitude axis 480 may be preset. According to an embodiment the resolution of the amplitude axis 480 may be set to 0,2 dB, and the amplitudes to be recorded may span from a lowest amplitude of $A_{r1}$=−50 dB to a highest amplitude value $A_{r750}$=+100 dB.

With reference to FIG. 9, the illustrated table 470 is a representation of the histogram shown in FIG. 10, having amplitude bins 500, individually referred to by references r1 to r750, each amplitude bin r1 . . . r750 representing an amplitude level $A_r$. The table 470 also includes memory positions 510 for amplitude values A, and memory positions 520 for variables $N_r$ reflecting the occurrence.

Bin r1 is associated with an amplitude value $A_{r1}$ and with a memory position for a variable $N_{r1}$ for storing a value indicating how many times the amplitude Ar1 has been detected.

Before the start of a measuring session, all the occurrence variables $N_{r1}$ to $N_{r750}$ may be set to zero (0). Thereafter the measuring session may begin.

During the measuring session said detected peak amplitude values are sorted into corresponding amplitude ranges 500 so as to reflect occurrence N of detected peak amplitude values Ap within said plurality of amplitude ranges 500 (See FIG. 9).

The duration of the measurement session is controlled by measuring session controller 904, in dependence of time information provided by a clock 190 (FIG. 5).

At the end of the session, the switch 909A turns off, so that no more peak amplitude values can be added in the table. The occurrence values $N_r$ in the respective bins are divided by the relevant time value $T_{MeasV}$, counted e.g as an amount of seconds, so as to obtain an average occurrence frequency value $f_C$, expressed e.g. as pulses per second for each of the amplitude bins. Since these average values are counted as an average for the complete duration of the measuring session, the resulting value has been found to be advantageously reliable.

According to an embodiment, two occurrence frequency values $f_{C1}$ and $f_{C2}$ are to be identified. According to a preferred embodiment, the first occurrence frequency value $f_{C1}$ corresponds to a mean value of about 40 peak values per second, and the second occurrence frequency value $f_{C2}$ corresponds to a mean value of about 1000 peak values per second.

With reference to FIG. 8, the apparatus 14 further comprises
- a decimator 1010 adapted to generate a decimated digital signal $S_{RED}$ in dependence of said digital measurement signal $S_{MD}$, $S_R$ so that the decimated digital signal $S_{RED}$ has a reduced sampling frequency $f_{SR}$; $f_{SR1}$; and
- a Fourier Transformer 1020 adapted to generate a transformed signal $S_{FT}$ in dependence of a selected second temporal portion of said decimated digital signal $S_{RED}$; so that said transformed signal $S_{FT}$ is indicative of said vibration signal repetition frequency $f_D$. The apparatus may be arranged to coordinate the generation of said transformed signal $S_{FT}$ with the generation of the first condition value $LR_D$ so that the selected second temporal portion of said decimated digital signal $S_{RED}$ is based substantially on said selected first temporal portion of the digital measurement signal $S_{MD}$, and so that said selected first temporal portion of the digital measurement signal $S_{MD}$ is generated during the variably settable duration $T_{Meas}$ of said measuring session.

FIG. 11 is an illustration of a cumulative histogram table 530 corresponding to the histogram table of FIG. 9. The cumulative histogram table of FIG. 11 includes the same number of amplitude range bins as the FIG. 9 table. In the cumulative histogram the occurrence N' is reflected as the number of occurrences of detected peaks having an amplitude higher than the amplitude $A_r'$ of associated amplitude bin r. This advantageously provides for a smoother curve when the cumulative histogram is plotted. Whereas the 'ordinary' histogram reflecting a limited number of observations will reflect a lack of observations N at an amplitude bin as a notch or dent at that bin, the cumulative histogram will provide a smoother curve, which makes is more suitable for use in estimating occurrence at one amplitude level based on the observation of occurrences at other amplitude levels.

According to an embodiment of the invention, the data of the table of FIG. 9 may advantageously be arranged as a cumulative histogram 530, and the two occurrence frequency values $f_{C1}$ and $f_{C2}$ may be identified from the cumulative histogram 530. According to an embodiment, the first occurrence frequency value $f_{C1}$ may correspond to a mean value of about 40 peak values per second, and the second occurrence frequency value $f_{C2}$ may correspond to a mean value of about 1000 peak values per second.

Figure 12:
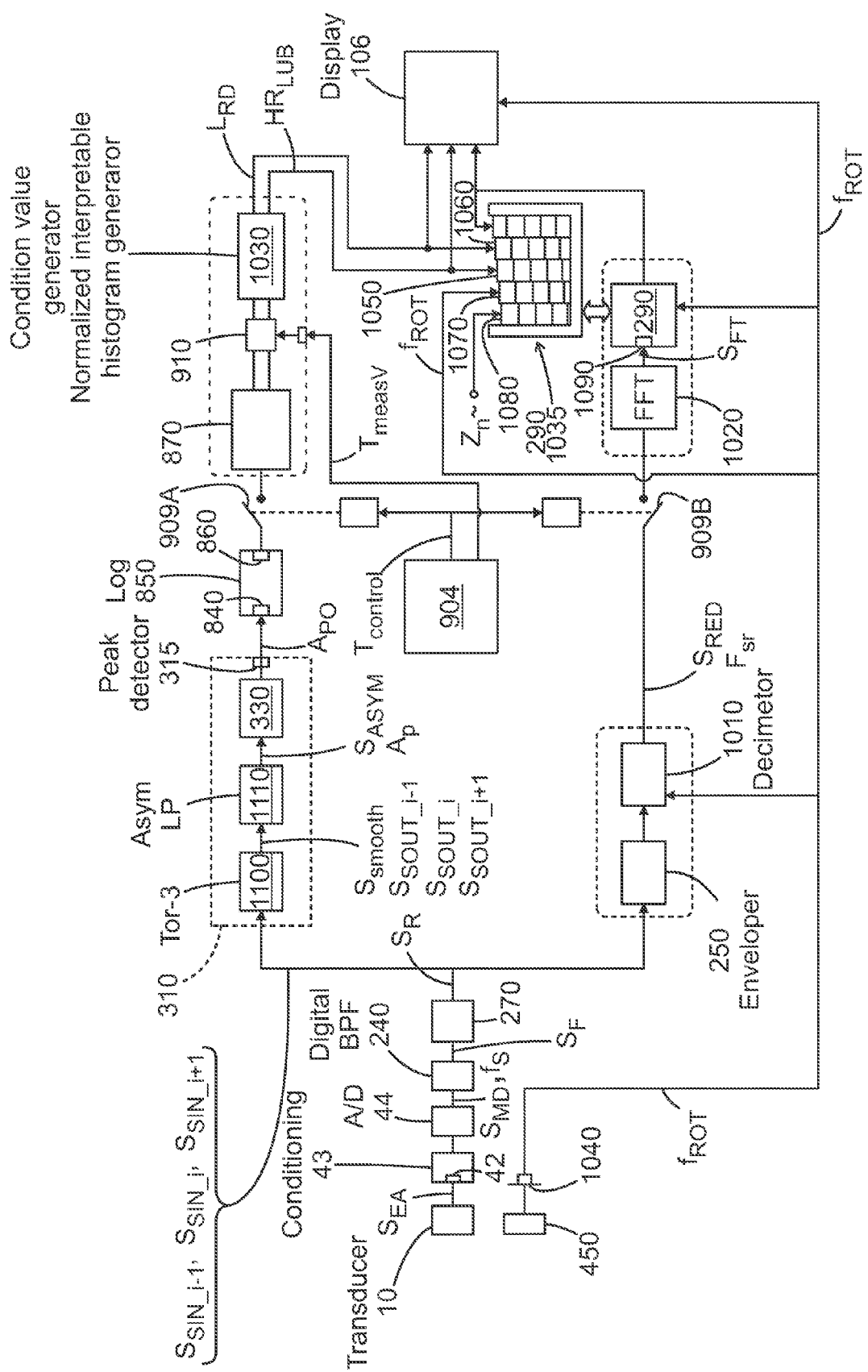
FIG. 12 is a schematic block diagram of another embodiment of the analysis apparatus.

FIG. 12 is a schematic block diagram of another embodiment of the analysis apparatus 14. The illustrated apparatus 14 includes a transducer 10 for converting mechanical vibrations in a bearing to analogue electrical oscillations $S_{EA}$. The presently preferred transducer may comprise a resonant piezoelectric accelerometer, as described above in this document. The analogue signal $S_{EA}$ from the transducer 10 may be delivered to a conditioning circuit 43 which may be coupled to receive the analogue signal $S_{EA}$, and an A/D converter 44 may be coupled to receive the conditioned analogue signal from the conditioning circuit 43. The A/D converter 44 samples the received conditioned analogue signal with a certain sampling frequency $f_S$ so as to deliver a digital measurement data signal $S_{MD}$ having said certain sampling frequency $f_S$ and wherein the amplitude of each sample depends on the amplitude of the received analogue signal at the moment of sampling.

The digital measurement data signal $S_{MD}$ may be filtered, e.g. by a digital filter 240, so that the resulting digitally filtered signal $S_F$ has an upper frequency limit value $f_{SEAmax}$ corresponding to an upper cutoff filter frequency $f_{UC}$. The digital filter 240 may be a digital band pass filter 240 as described in connection with FIG. 6A and/or FIG. 6B.

A digital rectifier 270 may be provided to perform a rectification of the digital signal so as to generate a rectified digital signal $S_R$. According to a preferred embodiment the digital rectifier 270 is adapted to perform a full-wave rectification so as to generate a rectified digital signal $S_R$. According to a most preferred embodiment, as illustrated in FIG. 12, the digital rectifier 270 is adapted to perform a full-wave rectification of the digitally filtered signal so as to generate the rectified digital signal $S_R$. The rectified signal $S_R$ may be delivered to a digital peak value detector 310 as well as to an enveloper 250.

The digital peak value detector 310 may be adapted to generate output peak values $A_{PO}$ on a peak detector output 315 dependent on said sequence of sample values $S_{MD}$, $S_R$, $S_F$.

The detected signal peaks or detected signal peak values $A_{PO}$ may be delivered from the peak detector output 315 to an input 840 of a log generator 850. The log generator 850 is adapted to generate the logarithmic amplitude values corresponding to the amplitude of the received detected signal peaks or detected signal peak values $A_{PO}$. Hence, an output 860 of log generator 850 is adapted to deliver logarithmic amplitude values.

A value sorter 870, also referred to as peak value discriminator 870, is adapted to receive the logarithmic amplitude values and to sort the received the logarithmic amplitude values into amplitude bins corresponding to the received logarithmic amplitude values during a measuring session. Hence, the value sorter 870 may be adapted to deliver sorted amplitude values $A_{PO}$, e.g. in the form of a table 470 at the end of a measuring session. The table 470 may be a table histogram 470 and/or a cumulative histogram table 530, as discussed and illustrated in connection with FIGS. 9 and/or 11 below.

A measuring session controller 904 may be provided to control a variably settable duration $T_{Meas}$ of the measuring session. The measuring session controller 904 may provide a control signal $T_{control}$ so as to turn on switches 909A and 909B simultaneously, or substantially simultaneously, and so as to turn off the switches 909A and 909B simultaneously, or substantially simultaneously. In such a manner the switches 909A and 909B may be switched on at the start of the measuring session duration $T_{Meas}$, and the switches 909A and 909B may be switched off at the end of the measuring session duration $T_{Meas}$. In this manner the peak value discriminator 870 will operate for the duration of the measuring session duration $T_{Meas}$, and at the end of the measuring session duration $T_{Meas}$ the relevant time value $T_{MeasV}$, counted e.g. as an amount of seconds, may be stored in association with the table 470, 530. The relevant time value $T_{MeasV}$ may be stored in a memory 910, as illustrated in FIG. 12. The memory 910 may also store the histogram table 470 and/or cumulative histogram table 530 delivered from the value sorter 870. The memory 910 may be embodied by the memory 52 (FIG. 2A) or it may be embodied by a memory internal to the processor 50.

The measuring session duration $T_{Meas}$ may be settable by a user via the user interface 102 (see FIG. 2A). Alternatively, the measuring session duration $T_{Meas}$ may be settable in dependence on the duration necessary for obtaining a desired frequency resolution by the Fast Fourier Transformer 1020.

At the end of the measuring session, the switch 909A turns off, so that no more peak amplitude values can be added in the histogram table 470 and/or cumulative histogram table 530. A condition value generator 1030 is adapted to receive the relevant time value $T_{MeasV}$ and the histogram table 470 and/or cumulative histogram table 530 from the value sorter 870. The condition value generator 1030 operates to divide the occurrence values $N_r$ in the respective bins by the relevant time value $T_{MeasV}$, counted e.g. as an amount of seconds, so as to obtain an average occurrence frequency value $f_C$, expressed e.g. as pulses per second for each of the amplitude bins. Since these average values are counted as an average for the complete duration of the measuring session, the resulting value has been found to be advantageously reliable. Thus, an embodiment of the condition value generator 1030 operates to generate a normalized interpretable histogram. It is normalized in the sense that since the occurrence frequency values $f_C$ are averaged, the values of the normalized histogram will be useful for comparisons with corresponding values of other normalized interpretable histograms irrespective of the measurements session durations of the mutually different histogram values. In this manner an individual value of the normalized histogram will be useful for comparison with a reference value irrespective of the measurement session duration $T_{Meas}$ employed for generating the individual value.

According to an embodiment the condition value generator 1030 is adapted to generate a first condition value $LR_D$ in response to said sorted output peak values $A_{PO}$ and said duration $T_{Meas}$ so that said first condition value $LR_D$ is indicative of a first amplitude value $A_{LRD}$ having a first predetermined occurrence rate $f_{C1}$. According to a preferred embodiment the condition value generator 1030 is also adapted to generate a first condition value $LR_D$ in response to said sorted output peak values $A_{PO}$ and said duration- $T_{Meas}$ so that said first condition value $LR_D$ is based on a selected first temporal portion of the digital measurement signal $S_{MD}$, $S_R$.

According to an embodiment the condition value generator 1030 is also adapted to generate a second condition value $HR_{LUB}$ in response to said sorted output peak values $A_{PO}$ and said duration $T_{Meas}$ so that said second condition value $HR_{LUB}$ is indicative of an second amplitude value $A_{HRLUB}$ having a second predetermined occurrence rate $f_{C2}$, and so that said second condition value $HR_{LUB}$ is based on said selected first temporal portion of the digital measurement signal $S_{MD}$, $S_R$.

According to an embodiment, the first condition value $LR_D$ is indicative of the amplitude $A_{LRD}$ of peak values $A_{PO}$ having a first predetermined occurrence rate $f_{C1}$ of e.g. $f_{C1}$=40 pulses per second, and the second condition value $HR_{LUB}$ is indicative of a second amplitude value $A_{HRLUB}$ having a second predetermined occurrence rate $f_{C2}$ of e.g. $f_{C2}$=1000 pulses per second.

As mentioned above, the rectified signal $S_R$ may be delivered to a digital peak value detector 310 as well as to an enveloper 250. With reference to FIG. 12, the apparatus 14 further comprises a decimator 1010 adapted to generate a decimated digital signal $S_{RED}$ in dependence of said rectified signal $S_R$, as illustrated in FIG. 12, so that the decimated digital signal $S_{RED}$ has a reduced sampling frequency $f_{SR}$; and a Fourier Transformer 1020 adapted to generate a transformed signal $S_{FT}$ in dependence of a selected second temporal portion of said decimated digital signal $S_{RED}$ so that said transformed signal $S_{FT}$ is indicative of said vibration signal repetition frequency $f_D$.

The apparatus may be arranged to coordinate the generation of the transformed signal $S_{FT}$ with the generation of the first condition value $LR_D$ so that the selected second temporal portion of said decimated digital signal $S_{RED}$ is based substantially on said selected first temporal portion of the digital measurement signal $S_{MD}$, and so that said selected first temporal portion of the digital measurement signal $S_{MD}$ is generated during the variably settable duration $T_{Meas}$ of said measuring session.

The apparatus may also comprise an associator 1035 adapted to associate the first condition value $LR_D$ with the transformed signal $S_{FT}$, as illustrated in FIG. 12.

The FIG. 12 embodiment thus advantageously enables the delivery of a first condition value $LR_D$ which is indicative of the first amplitude value $A_{LRD}$ of peak values $A_{PO}$ having a first predetermined occurrence rate $f_{C1}$ and of a transformed signal $S_{FT}$ which is indicative of said vibration signal repetition frequency $f_D$ while ensuring that the first condition value $LR_D$ and the transformed signal SFT are consistent with each other, since both of them are based on the same or substantially the same temporal portion of the digital measurement signal $S_{MD}$. Hence, the provision of an associator 1035 adapted to associate the first condition value $LR_D$ with the transformed signal $S_{FT}$, as illustrated in FIG. 12, enables presentation of the first condition value $LR_D$ associated with the transformed signal $S_{FT}$. Such presentation may be achieved by the display 106, as illustrated in FIG. 12.

Hence, the first condition value $(LR_D)$ and the transformed signal (SFT) are based on concurrent measurement data, or substantially the same measurement data, and as such the first condition value $(LR_D)$ and the transformed signal (SFT) may complement each other by providing mutually different perspectives on the same event, i.e. the condition of the monitored rotatable machine part (7,8) during the measuring session, based on data collected during the whole duration $(T_{meas})$ of the measuring session, as mentioned above.

A sensor 450 may be provided for detecting speed of rotation $f_{ROT}$ associated with the rotatable part 7,8 of the machine 6, as illustrated in FIGS. 1, 8 and 12, so as to generate a signal indicative of detected speed of rotation $f_{ROT}$. The signal indicative of detected speed of rotation $f_{ROT}$ may be provided to an apparatus input 1040 for receiving the signal indicative of detected speed of rotation $f_{ROT}$ associated with said rotatable part 7, 8. The signal indicative of detected speed of rotation $f_{ROT}$ may be delivered to the decimator 1010 and/or to the condition analyzer 290 and/or to the display 106, and/or to the associator 1035, as illustrated in FIG. 12.

According to an embodiment the apparatus comprises an analyser 290 having a first analyzer input 1050 for receiving said first condition value $LR_D$; and a second analyzer input 1060 for receiving said second condition value $HR_{LUB}$; wherein the analyzer 290 is adapted to generate a status signal indicative of whether the condition of the machine is normal or abnormal in dependence on said first condition value $LR_D$ and said second condition value $HR_{LUB}$. The fact that the apparatus may generate the first condition value $LR_D$ and the second condition value $HR_{LUB}$ on the basis of measurement data $S_{MD}$, $S_R$ collected during the uninterrupted time period of the variably settable duration $T_{Meas}$ of said measuring session advantageously increases the reliability of the first condition value $LR_D$ and the second condition value $HR_{LUB}$ in the sense of truly reflecting the condition of the monitored part. When, for example, the monitored rotatable part is a bearing in a crane which sometimes carries a heavy load, and which sometimes runs substantially unloaded, the bearing will sometimes be subjected to a large force due to the carrying of the heavy load. In such a case it is desirable that the measurement data collected, i.e. the selected first temporal portion of the digital measurement signal $S_{MD}$, $S_R$, includes the time period when the bearing is subjected to a large force. The variably settable duration $T_{Meas}$ of the measurement session advantageously enables an operator of the apparatus to set the duration $T_{Meas}$ so as to include the loaded time period in the measurement session.

According to an embodiment the apparatus comprises an apparatus input 1040 for receiving a signal indicative of a detected speed of rotation $(f_{ROT})$ associated with said rotatable part 7,8 (see FIGS. 1 and 12). The apparatus may also comprise a third analyzer input 1070 for receiving said signal indicative of a detected speed of rotation $(f_{ROT})$; and a fourth analyzer input 1080 for receiving a bearing frequency factor value (OR, IR, FTF, BS); and a fifth analyzer input 1090 for receiving said transformed signal $(S_{FT}, f_D)$. Moreover, the analyzer may be adapted to generate a status signal indicative of the nature of, and/or cause for, an abnormal machine condition in dependence of said speed of rotation signal ($f_{ROT}$), said bearing frequency factor value (OR, IR, FTF, BS) and said transformed signal ($S_{FT}$, $f_D$).

According to an embodiment the analyzer 290, 1035 is adapted to generate a status signal indicative of a probable location of an incipient damage in dependence of
said speed of rotation signal $f_{ROT}$,
said bearing frequency factor value OR, IR, FTF, BS and said transformed signal $S_{FT}$, $f_D$.

According to an embodiment, the analyzer 290, 1035 is adapted to extract said at least one vibration signal repetition frequency ($f_D$) from said transformed signal ($S_{FT}$, $f_D$); and the analyzer is adapted to generate a frequency factor estimate ($F_{fEST}$) in dependence on said at least one vibration signal repetition frequency ($f_D$) and said detected speed of rotation ($f_{ROT}$); and the analyzer is adapted to compare the generated frequency factor estimate ($F_{fEST}$) with a stored plurality of frequency factors ($F_{fstore1}$, $F_{fstore2}$, $F_{fstore3}$, ... $F_{fstoren}$); and wherein
the analyzer is adapted to generate a status signal indicative of a probable location of an incipient damage in dependence of said frequency factor comparison. This solution may advantageously provide an explicit indication to the effect that a detected damage is located e.g. on the outer ring of a monitored bearing assembly, when the generated frequency factor estimate ($F_{fEST}$) has a value that substantially corresponds to a stored value of an Outer Ring frequency factor value.

Correct detection of peak amplitude values in a sampled version of an analogue measurement signal $S_{EA}$ having transient vibration signal signatures ($S_D$) having a vibration frequency ($f_{SEA}$) and at least one repetition frequency ($f_D$) require a high sample rate in order to actually sample the analogue signal at a moment of peak value. This problem is addressed by the following embodiment: An embodiment of an apparatus for analysing the condition of a machine having a part (7) rotatable with a speed of rotation ($f_{ROT}$), comprises: an input 42 for receiving an analogue measurement signal $S_{EA}$ indicative of a vibration signal signature ($S_D$) having a vibration frequency $f_{SEA}$ and at least one repetition frequency $f_D$; and an A/D converter 40, 44) adapted to generate a digital measurement signal $S_{MD}$ dependent on the analogue measurement signal, said digital measurement signal $S_{MD}$ having a first sample rate ($f_S$), the first sample rate being at least twice (k) said vibration frequency ($f_{SEA}$).

With reference to FIG. 12, this embodiment also comprises a digital rectifier 270 adapted to perform full-wave rectification so as to generate a rectified digital signal $S_R$ dependent on said digital measurement signal $S_{MD}$; and a smoothing stage 1100 adapted to generate a smoothened digital signal ($S_{Smooth}$) dependent on said rectified digital signal ($S_R$). The smoothing stage 1100 is adapted to adjust an output sample amplitude value ($S_{SOUT\_i}$) upwards in dependence on
the amplitude of the corresponding input sample amplitude value ($S_{SIN\_i}$) and in dependence on
the amplitude of temporally adjacent input sample amplitude values ($S_{SIN\_i-1}$, $S_{SIN\_i+1}$).

Advantageously, the smoothing stage will eliminate "dents" in the rectified signal, and it will do so by always adjusting the amplitude upwards. Thus, whereas the rectified signal $S_R$ may include a sampled value $S_{SIN\_i}$ having significantly lower amplitude that its temporally adjacent neighbour samples $S_{SIN\_i-1}$ and $S_{SIN\_i+i}$, the signal $S_{SMOOTH}$ from the smoothing stage will always be smooth. Hence, smoothing stage 1100 may be adapted to adjust an output sample amplitude value $S_{SOUT\_i}$, wherein i denotes the temporal position of the sample, upwards in dependence on the amplitude of the corresponding input sample amplitude value $S_{SIN\_i}$ and in dependence on the amplitude of temporally preceding input sample amplitude value $S_{SIN\_i-1}$, as well as in dependence on the amplitude of temporally succeeding the input sample amplitude value $S_{SIN\_i+1}$.

Whereas a smoothing effect may also be achieved by means of a median-value-filter, the median-filter would also reduce the top amplitude value of the output signal in relation to the top value of the rectified input signal. Hence, whereas a median-filter would make the signal more smooth, the smoothing stage as defined above will not only make the signal more smooth, but it will also maintain the amplitude values of the highest detected amplitudes in the rectified signal.

With reference to FIG. 12, this embodiment also comprises an asymmetric digital filter 1110 for generating an asymmetrically low pass filtered signal $S_{ASYM}$ in response to the smoothed digital signal $S_{Smooth}$. The asymmetric digital filter 1110 may be adapted to generate the asymmetrically filtered signal ($S_{ASYM}$) so that in response to a detected positive time derivative of the smoothed digital a first settable filter value k is set to a first value KRise; and in response to a detected negative time derivative of the smoothed digital signal said first settable filter value (k) is set to a second value kFall.

A peak detector 330 may be adapted to detect the peak value $A_P$ of the asymmetrically filtered signal $S_{ASYM}$, as illustrated in FIG. 12, and to deliver the output peak values $A_{PO}$ on a peak value detector output 315. The peak detector 330 may be adapted to limit the delivery frequency of said output peak values $A_{PO}$ such that said output peak values $A_{PO}$ are delivered at a maximum delivery frequency of $f_{dP}$, wherein $$f_{dP}=f_S/e$$

where $f_S$ is the first sample rate of the A/D converter 40, 44 adapted to generate the digital measurement signal $S_{MD}$, and e is an a number higher than two.

According to an embodiment, the smoothing stage 1100 includes
a first peak sample selector 1100 adapted to analyze v consecutive received sample values, and to identify the highest amplitude of these v consecutive received sample values, and to deliver v consecutive output sample values with at least one of the v consecutive output sample values having an adjusted amplitude value, said adjustment being an amplitude increase,
wherein, v is an integer having a value of about fs divided by $f_{SEA}$.

According to an embodiment, the smoothing stage includes
a first peak sample selector 1100 which is adapted to receive a plurality of temporally consecutive sample values of the rectified signal $S_R$; and
the first peak sample selector 1100 is adapted to identify the amplitude of a selected sample value $S_{SIN\_i}$ from among said received plurality of consecutive sample values; and
the first peak sample selector 1100 is adapted to analyze the amplitude of the selected sample value $S_{SIN\_i}$,
the amplitude of the sample $S_{SIN\_i-1}$ immediately preceding the selected sample value $S_{SIN\_i}$ and
the amplitude of the sample $S_{SIN\_i+1}$ succeeding the selected sample value $S_{SIN\_i}$; and
deliver an output sample value $S_{SOUT\_i}$ in response to said selected sample value $S_{SIN\_i}$ so that said output sample value $S_{SOUT\_i}$ has an amplitude corresponding to the highest amplitude detected in said analysis.

According to an embodiment, the asymmetric digital filter 1110 is adapted to generate the asymmetrically filtered signal ($S_{ASYM}$) so that in response to a detected positive time derivative of the smoothed digital signal ($S_{Smooth}$) the asymmetrically filtered signal ($S_{ASYM}$) will have a positive time derivative substantially equal to that of the smoothed digital signal ($S_{Smooth}$); and in response to a detected negative time derivative of the smoothed digital signal ($S_{Smooth}$) the asymmetrically filtered signal ($S_{ASYM}$) will have a comparatively slow response.

The invention claimed is:

1. An apparatus for analysing the condition of a machine having a part rotatable with a speed of rotation, comprising:
   a transducer for generating an analogue measurement signal in response to machine vibration so that said analogue measurement signal includes a vibration signal signature having
      a vibration frequency which is lower than an upper frequency limit value,
      at least one vibration signal repetition frequency, and
      a vibration signal amplitude;
   an A/D converter (40, 44) adapted to generate a digital measurement signal ($S_{MD}$, $S_R$) having a sequence of sample values dependent on the analogue measurement signal, said digital measurement signal having a first sample rate that is at least twice said upper frequency limit value;
   a digital peak value detector adapted to generate output peak values dependent on said sequence of sample values;
   a peak value discriminator being adapted to sort said output peak values into corresponding amplitude ranges during a measuring session;
   a measuring session controller adapted to control a variably settable duration of said measuring session;
   a condition value generator adapted to generate a first condition value in response to said sorted output peak values and said duration
      so that said first condition value is indicative of a first amplitude value having a first predetermined occurrence rate, and
   so that said first condition value is based on a selected first temporal portion of the digital measurement signal;
   a decimator adapted to generate a decimated digital signal in dependence of said digital measurement signal so that the decimated digital signal has a reduced sampling frequency; and
   a Fourier Transformer adapted to generate a transformed signal in dependence of a selected second temporal portion of said decimated digital signal so that said transformed signal is indicative of said vibration signal repetition frequency,
   said apparatus being arranged to coordinate the generation of said transformed signal with the generation of the first condition value
      so that the selected second temporal portion of said decimated digital signal is based substantially on said selected first temporal portion of the digital measurement signal, and
      so that said selected first temporal portion of the digital measurement signal is generated during the variably settable duration of said measuring session.

2. The apparatus according to claim 1, wherein the condition value generator is adapted to generate a second condition value in response to said sorted output peak values and said duration
   so that said second condition value is indicative of an second amplitude value having a second predetermined occurrence rate, and
   so that said second condition value is based on said selected first temporal portion of the digital measurement signal.

3. The apparatus according to claim 2, further comprising:
   an analyzer, having a first analyzer input for receiving said first condition value, and a second analyzer input for receiving said second condition value,
   wherein the analyzer is adapted to generate a status signal indicative of whether the condition of the machine is normal or abnormal in dependence on said first condition value and said second condition value.

4. The apparatus according to claim 1, further comprising:
   an analyzer, having a first analyzer input for receiving said first condition value, and a second analyzer input for receiving said second condition value,
   wherein the analyzer is adapted to generate a status signal indicative of whether the condition of the machine is normal or abnormal in dependence on said first condition value ($LR_D$) and said second condition value.

5. The apparatus according to claim 4, further comprising:
   an apparatus input for receiving a signal indicative of a detected speed of rotation associated with said rotatable part;
   a third analyzer input for receiving said signal indicative of a detected speed of rotation;
   a fourth analyzer input for receiving a bearing frequency factor value; and
   a fifth analyzer input for receiving said transformed signal,
   wherein the analyzer is adapted to generate a status signal indicative of the nature of, and/or cause for, an abnormal machine condition in dependence of said speed of rotation signal, said bearing frequency factor value and said transformed signal.

6. The apparatus according to claim 4, further comprising:
   an apparatus input for receiving a signal indicative of a detected speed of rotation associated with said rotatable part;
   a third analyzer input for receiving said signal indicative of a detected speed of rotation;
   a fourth analyzer input for receiving a bearing frequency factor value; and
   a fifth analyzer input for receiving said transformed signal,
   wherein the analyzer is adapted to generate a status signal indicative of a probable location of an incipient damage in dependence of
      said speed of rotation signal,
      said bearing frequency factor value, and
      said transformed signal.

7. The apparatus according to claim 4, further comprising:
   an apparatus input for receiving a signal indicative of a detected speed of rotation associated with said rotatable part;
   a third analyzer input for receiving said signal indicative of a detected speed of rotation;
   a fourth analyzer input for receiving a bearing frequency factor value; and
   a fifth analyzer input for receiving said transformed signal, wherein
the analyzer is adapted to extract said at least one vibration signal repetition frequency from said transformed signal,
the analyzer is adapted to generate a frequency factor estimate in dependence on said at least one vibration signal repetition frequency and said detected speed of rotation,
the analyzer is adapted to compare the generated frequency factor estimate with a stored plurality of frequency factors, and
the analyzer is adapted to generate a status signal indicative of a probable location of an incipient damage in dependence of said frequency factor comparison.

8. The apparatus according to claim 1, further comprising:
an associator, adapted to associate said first condition value with said transformed signal.

9. The apparatus according to claim 1, further comprising:
a digital rectifier adapted to perform a rectification so as to generate a rectified digital signal dependent on said digital measurement signal, (SMD)
wherein
the digital peak value detector is adapted to generate the output peak values dependent on said rectified digital signal, and
said decimator is adapted to perform said decimation on the rectified digital signal so as to achieve said decimated digital signal having a reduced sampling frequency.

10. The apparatus according to claim 9, wherein the digital rectifier is adapted to perform a full-wave rectification so as to generate a rectified digital signal dependent on said digital measurement signal including absolute values of said sequence of sample values.

11. An apparatus for analysing the condition of a machine having a part rotatable with a speed of rotation, comprising:
an input for receiving an analogue measurement signal indicative of a vibration signal signature having a vibration frequency and at least one repetition frequency;
an A/D converter adapted to generate a digital measurement signal having a sequence of sample values dependent on the analogue measurement signal, said digital measurement signal having a first sample rate, wherein said vibration frequency is assumed to be lower than half of the first sample rate;
a digital rectifier adapted to perform a rectification so as to generate a rectified digital signal dependent on said digital measurement signal;
a digital peak value detector adapted to deliver output peak values on a peak value detector output dependent on said rectified digital signal;
a peak value discriminator being adapted to sort said output peak values into corresponding amplitude ranges during a measuring session;
a measuring session controller adapted to control a duration of said measuring session;
a condition value generator adapted to generate a first condition value in response to said sorted output peak values and said duration so that said first condition value is based on a selected first temporal portion of the digital measurement signal;
a decimator for performing a decimation of the rectified digital signal so as to achieve a decimated digital signal having a reduced sampling frequency; and a Fourier Tranformer adapted to generate a transformed signal in dependence on a selected second temporal portion of said decimated digital signal,
said apparatus being arranged to coordinate the generation of said transformed signal with the generation of the first condition value so that the selected second temporal portion of said decimated digital signal is based substantially on said selected first temporal portion of the digital measurement signal.

12. An apparatus for analysing the condition of a machine having a part rotatable with a speed of rotation, comprising:
an input for receiving an analogue measurement signal indicative of a vibration signal signature having a vibration frequency and at least one repetition frequency;
an A/D converter adapted to generate a digital measurement signal dependent on the analogue measurement signal, said digital measurement signal having a first sample rate, the first sample rate being at least twice said vibration frequency;
a digital rectifier adapted to perform full-wave rectification so as to generate a rectified digital signal dependent on said digital measurement signal;
a smoothing stage adapted to generate a smoothened digital signal dependent on said rectified digital signal, said smoothing stage being adapted to adjust an output sample amplitude value upwards in dependence on the amplitude of the corresponding input sample amplitude value and in dependence on the amplitude of temporally adjacent input sample amplitude values;
an asymmetric digital filter for generating an asymmetrically low pass filtered signal in response to the smoothed digital signal, the asymmetric digital filter being adapted to generate the asymmetrically filtered signal so that
in response to a detected positive time derivative of the smoothed digital a first settable filter value is set to a first value, and
in response to a detected negative time derivative of the smoothed digital signal said first settable filter value (k) is set to a second value; and
a peak value detector adapted to deliver output peak values on a peak value detector output in response to said detected peak values,
wherein said peak value detector is adapted to limit the delivery frequency of said output peak values such that said output peak values are delivered at a maximum delivery frequency of $f_{dP}$, where $$f_{dP}=f_S/e$$

and where $f_S$ is said first sample rate, and e is a number higher than two.

13. The apparatus according to claim 12, wherein the smoothing stage includes
a first peak sample selector adapted to analyze v consecutive received sample values, and to identify the highest amplitude of these v consecutive received sample values, and to deliver v consecutive output sample values with at least one of the v consecutive output sample values having an adjusted amplitude value, said adjustment being an amplitude increase,
where v is an integer having a value of about $fs/f_{SEA}$, and where $f_{SEA}$ is the vibration frequency.

14. The apparatus according to claim 12, wherein the smoothing stage includes a first peak sample selector which is adapted to:

receive a plurality of temporally consecutive sample values;
identify the amplitude of a selected sample value from among said received plurality of consecutive sample values;
analyze
the amplitude of the selected sample value,
the amplitude of the sample immediately preceding the selected sample value, and
the amplitude of the sample succeeding the selected sample value; and
deliver an output sample value in response to said selected sample value so that said output sample value has an amplitude corresponding to the highest amplitude detected in said analysis.

15. The apparatus according to claim 12, wherein the asymmetric digital filter is adapted to generate the asymmetrically filtered signal so that
in response to a detected positive time derivative of the smoothed digital signal the asymmetrically filtered signal will have a positive time derivative substantially equal to that of the smoothed digital signal, and
in response to a detected negative time derivative of the smoothed digital signal the asymmetrically filtered signal will have a comparatively slow response.

16. The apparatus according to claim 12, further comprising:
a decimator;
a fourier transformer; and
a measuring session controller as previously defined.

17. The apparatus according to claim 16, wherein said apparatus is arranged to coordinate the generation of said transformed signal with the generation of the first condition value so that
the selected second temporal portion of said decimated digital signal is based substantially on said selected first temporal portion of the digital measurement signal,
and so that
said selected first temporal portion of the digital measurement signal is generated during the variably settable duration of said measuring session.

* * * * *